(12) United States Patent
Mohseni et al.

(10) Patent No.: US 8,521,237 B2
(45) Date of Patent: Aug. 27, 2013

(54) POWER SAVING BY LIMITING USE OF ADVANCED SIGNAL PROCESSING

(75) Inventors: Jafar Mohseni, San Diego, CA (US); Helena Deirdre O'Shea, San Diego, CA (US); William Stancer, Reading (GB)

(73) Assignee: QUALCOMM Incorporated, San Diego, CA (US)

( * ) Notice: Subject to any disclaimer, the term of this patent is extended or adjusted under 35 U.S.C. 154(b) by 183 days.

(21) Appl. No.: 13/009,646

(22) Filed: Jan. 19, 2011

(65) Prior Publication Data

US 2012/0052858 A1 Mar. 1, 2012

(51) Int. Cl.
*H04B 1/38* (2006.01)
(52) U.S. Cl.
USPC ........................ 455/574; 455/277.2
(58) Field of Classification Search
USPC ................... 455/674, 127.5, 226.1, 574, 135, 455/134, 127.1, 277.2
See application file for complete search history.

(56) References Cited

U.S. PATENT DOCUMENTS

| 5,363,411 | A | 11/1994 | Furuya et al. | |
|---|---|---|---|---|
| 2009/0029652 | A1 | 1/2009 | Xie et al. | |
| 2010/0304794 | A1* | 12/2010 | Beninghaus et al. | 455/574 |
| 2010/0321114 | A1* | 12/2010 | Okada et al. | 330/278 |
| 2011/0201279 | A1* | 8/2011 | Suzuki et al. | 455/67.11 |
| 2011/0280144 | A1 | 11/2011 | Mohseni et al. | |

FOREIGN PATENT DOCUMENTS

| EP | 1161107 A1 | 12/2001 |
|---|---|---|
| EP | 1841080 | 10/2007 |
| GB | 2328582 A | 2/1999 |
| GB | 2358550 A | 7/2001 |
| GB | 2358767 | 8/2001 |
| JP | H057169 A | 1/1993 |
| JP | 2008042383 A | 2/2008 |
| WO | 9962285 A1 | 12/1999 |
| WO | 2004042941 | 5/2004 |
| WO | 2004105255 A2 | 12/2004 |
| WO | 2010052669 A1 | 5/2010 |

OTHER PUBLICATIONS

Chapter II Demand & Response to Written Opinion Under Article 34 for PCT/US2011/049436 filed May 2, 2012.
International Search Report and Written Opinion—PCT/US2011/049436—ISA/EPO—Nov. 11, 2011.
Notification of Transmittal of The International Preliminary Report on Patentability PCT Application PCT/US2011/036749, issued by the EPO, dated Aug. 14, 2012.
PCT Application PCT/US2011/036749, filed May 17, 2011, published as WO2011146435.
Response to Written Opinion Under Article 34 PCT Application PCT/US2011/036749, dated Jul. 2, 2012.
Second Written Opinion (PCT 408) for PCT Application PCT/US2011/036749 issued by the EPO, dated May 7, 2012.

* cited by examiner

*Primary Examiner* — Tu X Nguyen
(74) *Attorney, Agent, or Firm* — QUALCOMM IP Department; James Hunt Yancey, Jr.

(57) ABSTRACT

Systems, methods, and devices are described for power saving techniques in mobile devices. A signal quality metric of a received wireless signal may be monitored. A determination is made when the signal quality metric exceeds a threshold quality level for a time period. A subset of the signal processing functionality may be de-activated responsive to the determination. There may be different thresholds depending on whether the mobile device is in idle or connected mode. There may also be different thresholds for various signal processing algorithms.

76 Claims, 13 Drawing Sheets

POWER SAVING BY LIMITING USE OF ADVANCED SIGNAL PROCESSING

CROSS REFERENCES

This application claims priority from U.S. Provisional Patent Application No. 61/378,884, filed Aug. 31, 2010, entitled "POWER SAVING BY LIMITING USE OF ADVANCED SIGNAL PROCESSING", which is hereby incorporated by reference, as if set forth in full in this document, for all purposes.

BACKGROUND

The present disclosure relates generally to wireless communications systems. More specifically, the present disclosure relates to power control in a wireless communications device. A wireless communications system may provide communication for a number of mobile devices. A mobile device may communicate with one or more base stations via transmissions on the uplink and the downlink. The uplink (or reverse link) refers to the communication link from the mobile device to the base station, and the downlink (or forward link) refers to the communication link from the base station to the device.

The resources of a wireless communication system (e.g., bandwidth and transmit power) may be shared among multiple subscriber stations. A variety of multiple access techniques are known, including code division multiple access (CDMA), time division multiple access (TDMA), frequency division multiple access (FDMA), orthogonal frequency division multiple access (OFDMA), single-carrier frequency division multiple access (SC-FDMA), and so forth.

Mobile devices are evolving as communications technology advances, in many cases providing new and improved functionality (e.g., streaming or interactive multimedia applications). This functionality, however, can come at the expense of higher rates of power consumption at the device.

In order to achieve better performance, advanced receiver functionality may be implemented (e.g., for gain control, equalization, and interference cancellation). These functions are often deployed while processing and decoding received signals, even when the device is in idle mode. These advanced algorithms add more processing requirements to the device, which may translate into more power consumption, impacting the usage (such as standy, talk, and data transfer) time. There may, therefore, be a need in the art to manage processing functionality at the receiver to decrease the rate of power consumption.

SUMMARY

Systems, methods, devices, and computer program products are described for the implementation of power saving techniques in mobile devices. A signal quality metric of a received wireless signal may be monitored. A determination is made when the signal quality metric exceeds a threshold quality level for a time period. A subset of the advanced signal processing functionality may be de-activated responsive to the determination. There may be different thresholds depending on whether the mobile device is in idle or connected mode. There may also be different thresholds for various signal processing algorithms. When a received wireless signal quality degrades (e.g., falling below a second threshold), the signal processing functionality may be re-activated.

An example of method for signal processing may include monitoring a signal quality metric associated with a received wireless signal; determining that the signal quality metric exceeds a threshold quality level for a time period; and de-activating a subset of signal processing functionality responsive to the determination. The method may include initiating a timer for the time period when a mobile device transitions to idle model; and suspending a timer for the time period when the mobile device transitions to connected mode. The threshold quality level may include a first threshold quality level when a mobile device is in idle mode; and a second threshold quality level, of higher quality than the first threshold quality level, when the mobile device is in connected mode.

The time period may include a first time period when a mobile device is in idle mode; and a second time period, longer than the first time period, when the mobile device is in connected mode. An example of the method may include a threshold quality level and a time period which may include a first threshold quality level and a first time period when a mobile device is in idle mode; and a second threshold quality level and a second time period, different from the first threshold quality level and the first time period, when the mobile device is in connected mode. An example of the method may include determining when the signal quality metric drops below a re-activation threshold quality level for a re-activation time period; and re-activating the subset of signal processing functionality responsive to the determination. The method may include a threshold quality level and a re-activation threshold quality level which are different levels.

The method may include a re-activation threshold quality level and a re-activation time period which may comprise a first re-activation threshold quality level and a first re-activation time period when a mobile device is in idle mode; and a second re-activation threshold quality level and a second re-activation time period, different from the first re-activation threshold quality level and the first re-activation time period, when the mobile device is in connected mode.

The subset of signal processing may include signal processing functionality comprising interference cancellation, equalization, amplification, adjacent channel interference correction, Doppler shift correction, frequency error correction, or phase error correction. An example of the method may include a threshold quality level and a time period which may comprise a first threshold quality level and a first time period for a first type of signal processing functionality; and a second threshold quality level and a second time period, different from the first threshold quality level and the first time period, for a second type of signal processing functionality. There may be reduced requirements for signal lock responsive to the determination, and there may be a delayed activation of signal processing functionality responsive to the determination. The method may include a signal quality metric which may comprise an averaged signal quality metric.

An example of a device for signal processing may include means for monitoring a signal quality metric associated with a received wireless signal; means for determining that the signal quality metric exceeds a threshold quality level for a time period; and means for de-activating a subset of signal processing functionality responsive to the determination. The device may further include means for initiating a timer for the time period when a mobile device transitions to idle mode. The device may further include means for determining when the signal quality metric drops below a re-activation threshold quality level for a re-activation time period; and means for re-activating the subset of signal processing functionality responsive to the determination.

An example of a mobile device for signal processing may include a receiver module configured to receive a wireless signal; a measurement module configured to measure a signal quality metric of the received wireless signal; and a de-activation module, communicatively coupled with the measurement module, and configured to monitor the measured signal quality, determine when the signal quality metric exceeds a threshold quality level for a time period, and de-activate a subset of baseband signal processing functionality responsive to the determination.

The de-activation module may initiate a first timer for the time period when the mobile device transitions to idle mode. The de-activation module may operate in connected mode or idle mode. The threshold quality level may include a first threshold quality level when the mobile device is in idle mode; and a second threshold quality level, of higher quality than the first threshold quality level, when the mobile device is in connected mode. The time period may include a first time period when a mobile device is in idle mode; and a second time period, longer than the first time period, when the mobile device is in connected mode.

The mobile device may also include a re-activation module, communicatively coupled with the measurement module, and configured to: determine that the signal quality metric has dropped below a re-activation threshold quality level for a re-activation time period; and re-activate the subset of signal processing functionality responsive to the determination. The threshold quality level and re-activation threshold quality level may comprise different levels.

The mobile device may include a re-activation threshold quality level and a re-activation time period which may include: a first re-activation threshold quality level and a first re-activation time period when the mobile device is in idle mode; and a second re-activation threshold quality level and a second re-activation time period, different in quality level or time from the first re-activation threshold quality level and the re-activation first time period, when the mobile device is in connected mode. The subset of signal processing may include signal processing functionality comprising interference cancellation, equalization, amplification, adjacent channel interference correction, Doppler shift correction, frequency error correction, phase error correction, or any combination thereof.

The requirements for signal lock may be reduced responsive to the determination, and activation of signal processing functionality may be delayed responsive to the determination.

An example of a computer program product may include computer-readable medium which may include code for causing a computer a signal quality metric associated with a wireless signal; code for causing a computer to determine that the signal quality metric exceeds a threshold quality level for a time period; and code for causing a computer to de-activate a subset of signal processing functionality responsive to the determination.

The computer program product may include code for causing a computer to initiate a timer for the time period when a mobile device transitions to idle mode. The computer program product may execute the code in idle or connected mode. The threshold quality level which may comprise: a first threshold quality level and a first time period when the mobile device is in idle mode; and a second threshold quality level and a second time period, different from the first threshold quality level and the first time period, when the mobile device is in connected mode.

The time period may comprise: a first time period when a mobile device is in idle mode; and a second time period, longer than the first time period, when the mobile device is in connected mode. There may be code for causing a computer to determine that the signal quality metric has dropped below a re-activation threshold quality level for a re-activation time period; and code for causing a computer to re-activate the subset of signal processing functionality responsive to the determination. The threshold quality level and a re-activation threshold quality level may comprise different levels.

The subset of signal processing may include signal processing functionality comprising interference cancellation, equalization, amplification, adjacent channel interference correction, Doppler shift correction, frequency error correction, or phase error correction. The threshold quality level and a time period may comprise: a first threshold quality level and a first time period for a first type of signal processing functionality; and a second threshold quality level and a second time period, different from the first threshold quality level and the first time period, for a second type of signal processing functionality. The requirements for signal lock may be reduced responsive to the determination, and activation of signal processing functionality may be delayed responsive to the determination.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION OF THE INVENTION

The following description generally relates to power control functionality for mobile devices. A signal quality metric of a received wireless signal may be monitored. A determination is made when the signal quality metric exceeds a threshold quality level for a time period. Advanced signal processing algorithms may be de-activated responsive to the determination. There may be different thresholds depending on whether the mobile device is in idle or connected mode. There may also be different thresholds for various signal processing algorithms.

This description provides examples, and is not intended to limit the scope, applicability, or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

The use of mobile devices continues to increase rapidly. In the GSM/EDGE Radio Access Network (GERAN) specification, GPRS and EGPRS provide data services. The standards for GERAN are maintained by the 3GPP (Third Generation Partnership Project). GERAN is a part of GSM. More specifically, GERAN is the radio part of GSM/EDGE together with the network that joins the base stations (the Ater and Abis interfaces) and the base station controllers (A interfaces, etc.). GERAN represents the core of a GSM network. It routes phone calls and packet data from and to the PSTN and Internet to and from remote terminals. GERAN is also a part of combined UMTS/GSM networks.

When in idle mode, mobile devices using wireless telephone technology (e.g., GSM) may regularly monitor the power of the neighboring cells, i.e., signal strength of transmitting neighboring base stations. This is typically done when the mobile device "wakes up" to decode the paging channel. Power monitoring may draw extra power from the battery because it involves extra operation time for radio frequency (RF) components and baseband processing components. Power monitoring may also lead to elongating the "awake time" when the amount of monitoring per paging channel (PCH) block is high. The idle mode current consumption, which directly affects the standby time of the mobile device, is a key measure in design and manufacturing.

Figure 1:
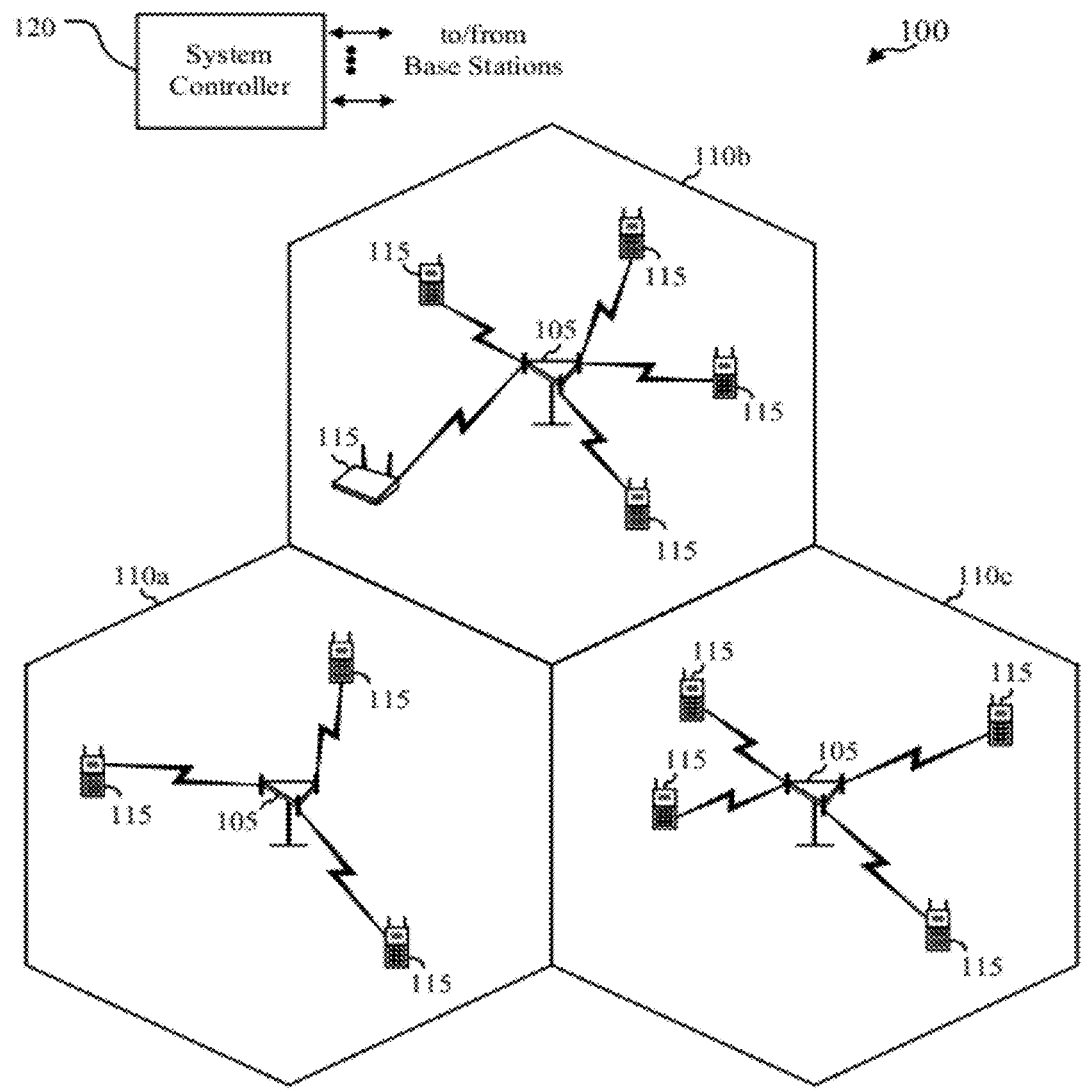
FIG. 1 illustrates an example of a wireless communications system in which the methods and apparatus disclosed herein may be utilized.

FIG. 1 shows an example of a wireless communications system 100 in which aspects disclosed herein may be utilized. The wireless communications system 100 includes multiple base stations (BS) 105 and multiple mobile devices 115. Each base station 105 provides communication coverage for a particular geographic area 110. The term "cell" can refer to a base station 105 and/or its coverage area 110 depending on the context in which the term is used.

As used herein, the term "mobile device" refers to an electronic device that may be used for voice and/or data communication over a wireless communication system (e.g., the system 100 of FIG. 1). Examples of mobile devices include cellular phones, personal digital assistants (PDAs), handheld devices, wireless modems, laptop computers, personal computers, etc. A mobile device may alternatively be referred to as an access terminal, a mobile terminal, a mobile station, a remote station, a user terminal, a terminal, a subscriber unit, a subscriber station, a mobile device, a wireless device, user equipment (UE), or some other similar terminology. The term "base station" refers to a wireless communication station that is installed at a fixed location and used to communicate with subscriber stations. A base station may alternatively be referred to as an access point, a NodeB, an eNodeB, or some other similar terminology.

To improve system capacity, a system coverage area 110 may be partitioned into multiple smaller areas, e.g., three smaller areas 110a, 110b, and 110c. Each smaller area 110a, 110b, 110c may be served by a respective base transceiver station (BTS) (not shown). The term "sector" can refer to a BS 105 and/or its coverage area 110 depending on the context in which the term is used. For a sectorized cell, the BTSs for all sectors of that cell are typically co-located within the base station 105 for the cell.

Mobile devices 115 are typically dispersed throughout the system 100. A mobile device 115 may communicate with zero, one, or multiple base stations 105 on the downlink and/or uplink at any given moment. A mobile device 115 may monitor signal quality, and determine that a signal quality metric exceeds a threshold quality level for a given time period. Advanced signal processing algorithms may be de-activated responsive to the determination. There may be different thresholds depending on whether the mobile device is in idle or connected mode. There may also be different thresholds for various signal processing functionality. If signal quality deteriorates, the de-activated signal processing functionality may be re-activated.

For a centralized architecture, a system controller 120 may be in communication with the base stations 105 and provide coordination and control for the base stations 105. The system controller 120 may be a single network entity or a collection of network entities. For a distributed architecture, base stations 105 may communicate with one another as needed.

Figure 2:
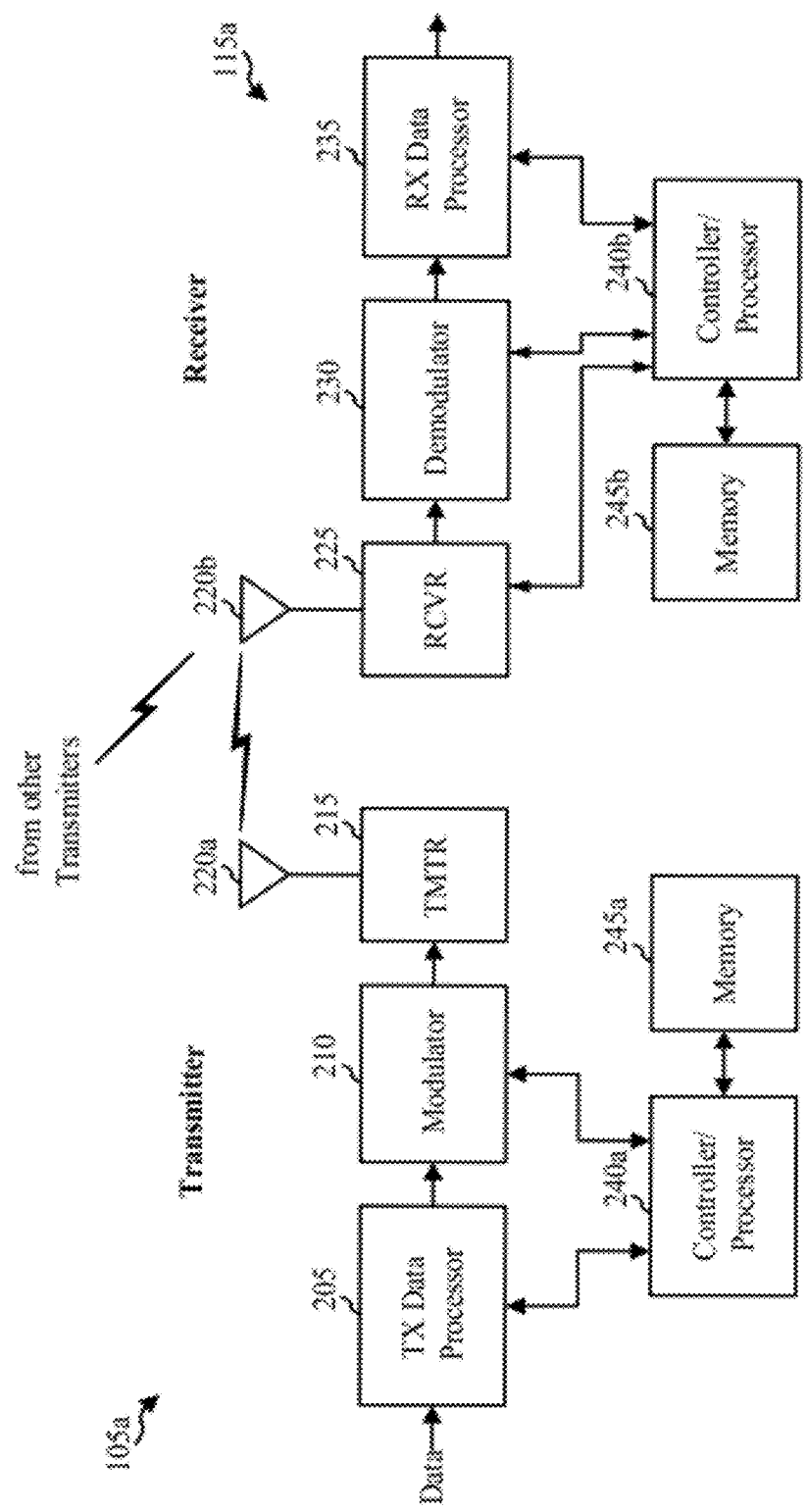
FIG. 2 illustrates a block diagram of a transmitter and a receiver in a wireless communications system.

FIG. 2 shows a block diagram of a transmitter 105a and a receiver 115a in a wireless communications system. For the downlink, the transmitter 105a may be part of a base station, and receiver 115a may be part of a wireless device. For the uplink, the transmitter 105a may be part of a wireless device, and receiver 115a may be part of a base station.

At transmitter 105a, a transmit (TX) data processor 205 receives and processes (e.g., formats, encodes, and interleaves) data and provides coded data. A modulator 210 performs modulation on the coded data and provides a modulated signal. Modulator 210 may perform Gaussian minimum shift keying (GMSK) for GSM, 8-ary phase shift keying (8-PSK) for Enhanced Data rates for Global Evolution (EDGE), etc. GMSK is a continuous phase modulation protocol whereas 8-PSK is a digital modulation protocol. A transmitter unit (TMTR) 215 conditions (e.g., filters, amplifies, and upconverts) the modulated signal and generates an RF modulated signal, which is transmitted via an antenna 220a.

At receiver 115a, an antenna 220b receives RF modulated signals from transmitter 215 and other transmitters. Antenna 220b provides a received RF signal to a receiver unit (RCVR) 225. Receiver unit 225 conditions (e.g., filters, amplifies, and downconverts) the received RF signal, digitizes the conditioned signal, and provides samples. A demodulator 230 processes the samples as described below and provides demodulated data. A receive (RX) data processor 235 processes (e.g., deinterleaves and decodes) the demodulated data and provides decoded data. In general, the processing by demodulator 230 and RX data processor 235 is complementary to the processing by modulator 210 and TX data processor 205, respectively, at transmitter 105a.

Controllers/processors 240a and 240b direct operation at transmitter 105a and receiver 115a, respectively. Memories 245a and 245b store program codes in the form of computer software and data used by transmitter 105a and receiver 115a, respectively.

Controller/processor 240b may perform a number of functions to limit power consumption. Controller/processor 240b may monitor a signal quality metric of a received wireless signal. The signal quality metric may be a measured signal-to-noise ratio, an estimated signal-to-noise ratio, a bit error rate, a received power level, re-encoded bit error rate (e.g., calculated on the PCH block), or any other communication link quality indicator. Controller/processor 240b may measure or estimate the signal quality, or may process information measured or estimated by other devices. Controller/processor 240b may determine when the signal quality metric exceeds a threshold quality level for a time period. The threshold quality may, for example, be measured in dB. The determination may be made based on an average signal quality over the time period, or there may be a requirement that the signal quality remain above the threshold for all of a given time period. A subset of the signal processing functionality may be de-activated in response to the determination.

There may be different threshold quality levels and time periods when a mobile device is operating in idle mode or connected mode. For example, when in idle mode certain advanced baseband signal processing functionality (e.g., interference cancellation, Doppler shift correction, frequency error correction, or phase error correction) may be de-activated shortly after the device transitions to idle mode. Thus, in one example, the time period may be initiated when the mobile device transitions to idle mode.

Thus, there may be a first threshold quality level and a first time period when a mobile device is in idle mode, and a second threshold quality level and a second time period, different from the first threshold quality level and the first time period, when the mobile device is in connected mode.

The de-activation process may also be dynamic, responding to changing signal qualities. For example, there may be a determination when the signal quality metric drops below a re-activation threshold quality level for a time period, and the de-activated subset of signal processing functionality may be re-activated in response to the determination. The threshold quality level and the re-activation threshold quality level may be set at different levels.

It is also worth noting that there may be different threshold quality levels and time periods for different types of advanced signal processing. For example, there may be a first threshold quality level and a first time period for a first type of signal processing functionality (e.g., interference cancellation), and a second threshold quality level and a second time period, different from the first threshold quality level and the first time period, for a second type of baseband signal processing functionality (Doppler shift correction).

Figure 3:
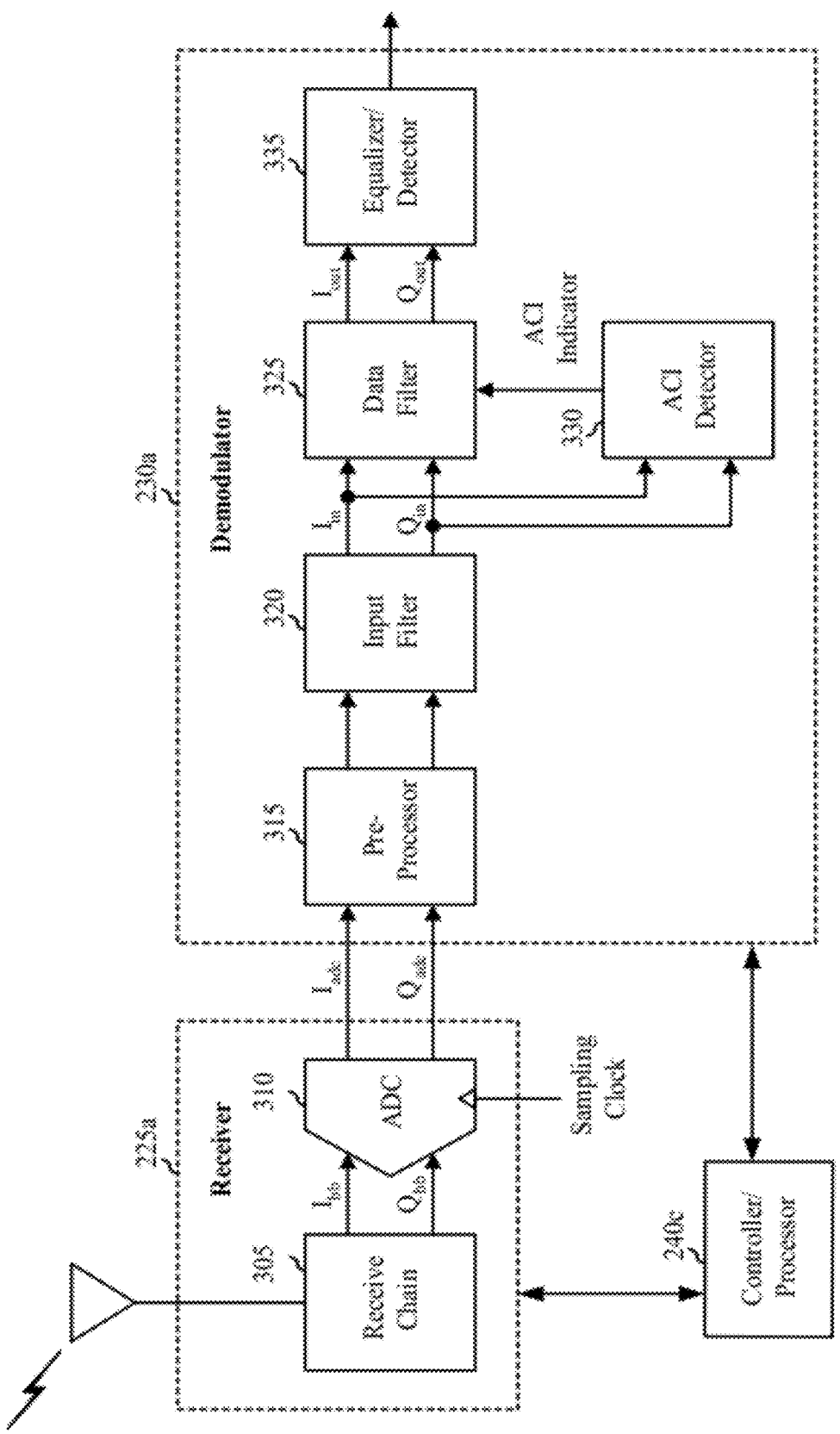
FIG. 3 illustrates a block diagram of a design of a receiver and demodulator at a receiver.

FIG. 3 shows a block diagram of a design of a receiver unit 225a, a demodulator 230a, and controller/processor 240c at a receiver (e.g., receiver 115a of FIG. 2). Within receiver unit 225a, a receive chain 305 processes the received RF signal and provides I and Q baseband signals, which are denoted as $I_{bb}$ and $Q_{bb}$. Receive chain 305 may perform low noise amplification, analog filtering, quadrature downconversion, etc. An analog-to-digital converter (ADC) 310 digitizes the I and Q baseband signals at a sampling rate of $f_{adc}$ and provides I and Q samples, which are denoted as $I_{adc}$ and $Q_{adc}$. In general, the ADC sampling rate $f_{adc}$ may be related to the symbol rate $f_{sym}$ by any integer or non-integer factor.

Within demodulator 230a, a pre-processor 315 performs pre-processing on the I and Q samples from ADC 310. For example, pre-processor 315 may remove direct current (DC) offset, remove frequency offset, etc. An input filter 320 filters the samples from pre-processor 315 based on a particular frequency response and provides input I and Q samples, which are denoted as $I_{in}$ and $Q_{in}$. Input filter 320 may filter the I and Q samples to suppress images resulting from the sampling by ADC 310 as well as jammers. Input filter 320 may also perform sample rate conversion, e.g., from 24× oversampling down to 2× oversampling. A data filter 325 filters the input I and Q samples from input filter 320 based on another frequency response and provides output I and Q samples, which are denoted as $I_{out}$ and $Q_{out}$. Filters 320 and 325 may be implemented with finite impulse response (FIR) filters, infinite impulse response (IIR) filters, or filters of other types. The frequency responses of filters 320 and 325 may be selected to achieve good performance. In one design, the frequency response of input filter 320 is fixed, and the frequency response of data filter 325 is configurable.

An adjacent channel interference (ACI) detector 330 receives the input I and Q samples from input filter 320, detects for ACI in the received RF signal, and provides an ACI indicator to data filter 325. The ACI indicator may indicate whether or not ACI is present and, if present, whether the ACI is due to the higher RF channel centered at +200 KHz and/or the lower RF channel centered at −200 KHz. The frequency response of data filter 325 may be adjusted based on the ACI indicator, as described below, to achieve good performance.

An equalizer/detector 335 receives the output I and Q samples from data filter 325 and performs equalization, matched filtering, detection, and/or other processing on these samples. For example, equalizer/detector 335 may implement a maximum likelihood sequence estimator (MLSE) that determines a sequence of symbols that is most likely to have been transmitted given a sequence of I and Q samples and a channel estimate.

The controller/processor 240c may be in communication with the receiver unit 225a and demodulator 230a, and control the operation of one or more of the components therein (e.g., any of the components described above with reference to FIG. 3) to achieve various power saving objectives. Controller/processor 240c may measure or monitor the signal quality. Controller/processor 240c may determine when the signal quality metric exceeds a threshold quality level for a time period (the threshold and time period may vary for different functionality and/or components, and further depend on whether a device is in idle or connected mode). The signal processing functionality associated with the threshold and time period may be de-activated in response to the determination. The signal processing functionality may be re-activated if signal quality degrades.

The Global System for Mobile Communications (GSM) is a widespread standard in cellular, wireless communication. GSM employs a combination of Time Division Multiple Access (TDMA) and Frequency Division Multiple Access (FDMA) for the purpose of sharing the spectrum resource. GSM networks typically operate in a number of frequency bands. For example, for uplink communication, GSM-900 commonly uses a radio spectrum in the 890-915 MHz bands (Mobile Station to Base Transceiver Station). For downlink communication, GSM 900 uses 935-960 MHz bands (base station to mobile station). Furthermore, each frequency band is divided into 200 kHz carrier frequencies providing 124 RF channels spaced at 200 kHz. GSM-1900 uses the 1850-1910 MHz bands for the uplink and 1930-1990 MHz bands for the downlink. Like GSM 900, FDMA divides the spectrum for both uplink and downlink into 200 kHz-wide carrier frequencies. Similarly, GSM-850 uses the 824-849 MHz bands for the uplink and 869-894 MHz bands for the downlink, while GSM-1800 uses the 1710-1785 MHz bands for the uplink and 1805-1880 MHz bands for the downlink.

An example of an existing GSM system is identified in technical specification document 3GPP TS 45.002 V4.8.0 (2003-06) entitled "Technical Specification 3rd Generation Partnership Project; Technical Specification Group GSM/EDGE Radio Access Network; Multiplexing and multiple access on the radio path (Release 4)", published by the 3rd Generation Partnership Project (3GPP) standards-setting organization. While aspects of this Specification may be used for purposes of example, the functionality described herein may be applied to a number of different standards.

Each channel in GSM may be identified by a specific absolute radio frequency channel (ARFCN). For example, ARFCN 1-124 may be assigned to the channels of GSM 900, while ARFCN 512-810 are assigned to the channels of GSM 1900. Similarly, ARFCN 128-251 may be assigned to the channels of GSM 850, while ARFCN 512-885 are assigned to the channels of GSM 1800. Also, each base station may be assigned one or more carrier frequencies. Each carrier frequency may be divided into eight time slots (which are labeled as time slots 0 through 7) using TDMA such that eight consecutive time slots form one TDMA frame with a duration of 4.615 ms. A physical channel occupies one time slot within a TDMA frame. Each active wireless device/user may be assigned one or more time slot indices for the duration of a call. User-specific data for each wireless device may be sent in the time slot(s) assigned to that wireless device and in TDMA frames used for the traffic channels.

Each time slot within a frame may be referred to as a "burst" in GSM. Each burst includes two tail fields, two data fields, a training sequence (or midamble) field, and a guard period (GP). The number of symbols in each field is shown inside the parentheses. A burst includes 148 symbols for the tail, data, and midamble fields. No symbols are sent in the guard period. TDMA frames of a particular carrier frequency are numbered and formed in groups of 26 or 51 TDMA frames called multi-frames.

Figure 4:
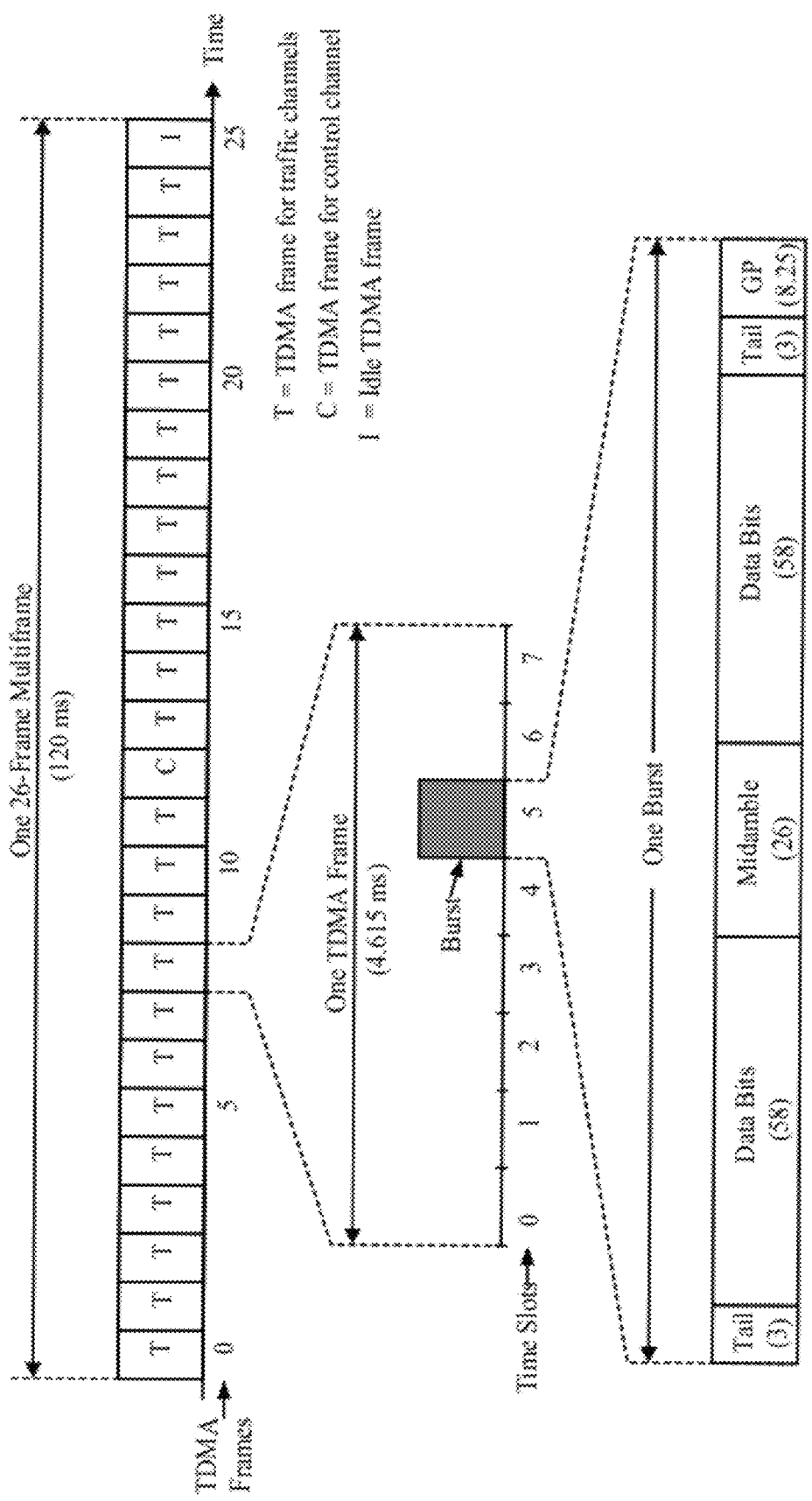
FIG. 4 illustrates example frame and burst formats in a GSM system.

FIG. 4 shows example frame and burst formats in GSM. The timeline for transmission is divided into multiframes. For traffic channels used to send user-specific data, each multi-frame in this example includes 26 TDMA frames, which are labeled as TDMA frames 0 through 25. The traffic channels are sent in TDMA frames 0 through 11 and TDMA frames 13 through 24 of each multiframe. A control channel is sent in TDMA frame 12. No data is sent in idle TDMA frame 25, which is used by the wireless devices to make measurements for neighbor base stations.

Figure 5:
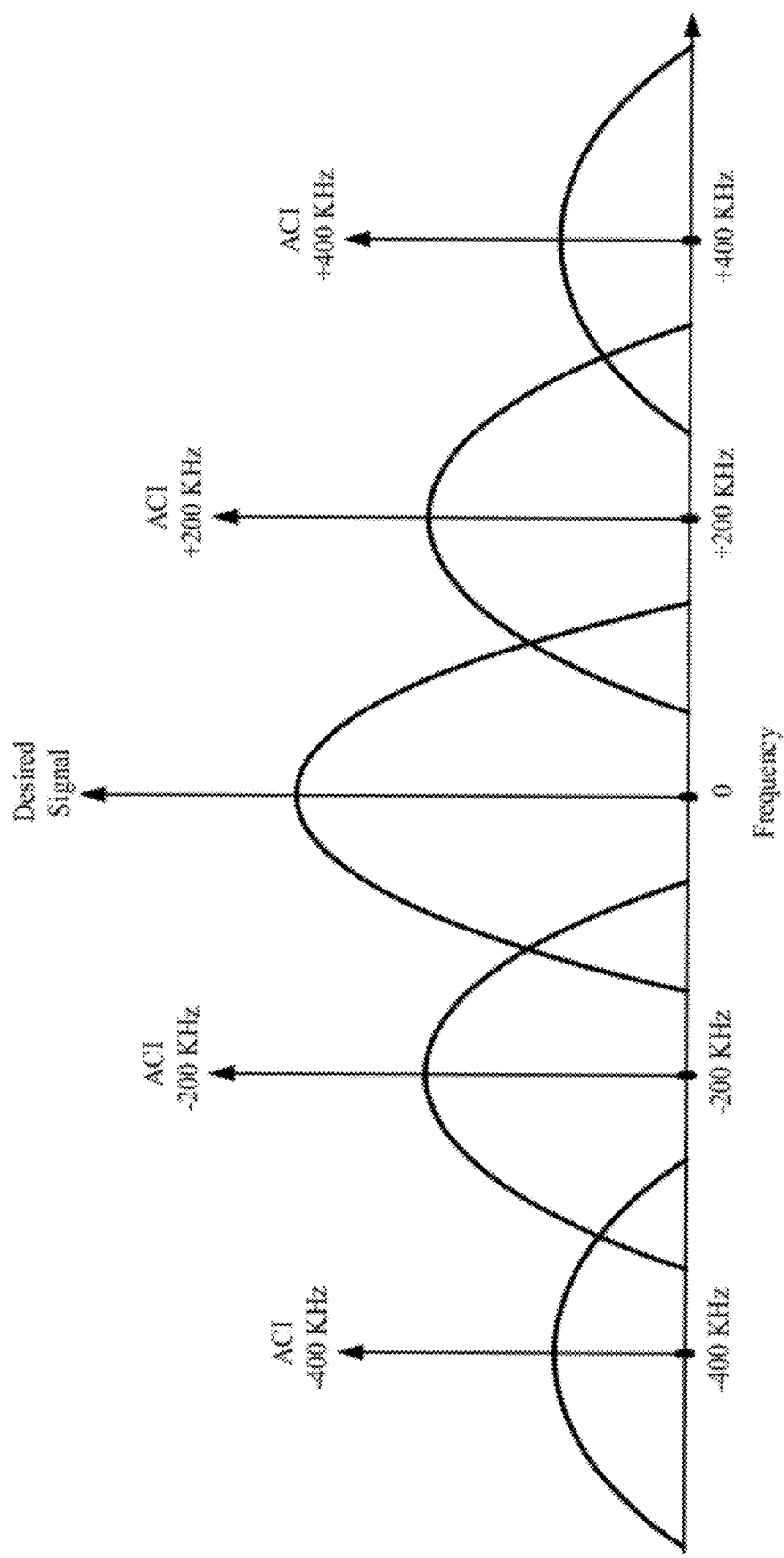
FIG. 5 illustrates an example spectrum in a GSM system.

FIG. 5 shows an example spectrum in a GSM system. In this example, five RF modulated signals are transmitted on five RF channels that are spaced apart by 200 KHz. The RF channel of interest is shown with a center frequency of 0 Hz. The two adjacent RF channels have center frequencies that are +200 KHz and −200 KHz from the center frequency of the desired RF channel. The next two nearest RF channels (which are referred to as blockers or non-adjacent RF channels) have center frequencies that are +400 KHz and −400 KHz from the center frequency of the desired RF channel. There may be other RF channels in the spectrum, which are not shown in FIG. 5 for simplicity. In GSM, an RF modulated signal is generated with a symbol rate of $f_{sym}$=13000/40=270.8 kilo symbols/second (Ksps) and has a −3 dB bandwidth of up to 135 KHz. The RF modulated signals on adjacent RF channels may thus overlap one another at the edges, as shown in FIG. 5.

One or more modulation schemes are used in GSM to communicate information such as voice, data, and/or control information. Examples of the modulation schemes may include GMSK (Gaussian Minimum Shift Keying), M-ary QAM (Quadrature Amplitude Modulation) or M-ary PSK (Phase Shift Keying), where $M=2^n$, with n being the number of bits encoded within a symbol period for a specified modulation scheme. GMSK is a constant envelope binary modulation scheme allowing raw transmission at a maximum rate of 270.83 kilobits per second (Kbps).

GSM is efficient for standard voice services. However, high-fidelity audio and data services desire higher data throughput rates due to increased demand on capacity to transfer both voice and data services. To increase capacity, the General Packet Radio Service (GPRS), EDGE (Enhanced Data rates for GSM Evolution) and UMTS (Universal Mobile Telecommunications System) standards have been adopted in GSM systems, and aspects of the invention may be applied to these standards, as well.

General Packet Radio Service (GPRS) is a non-voice service. It allows information to be sent and received across a mobile telephone network. It supplements Circuit Switched Data (CSD) and Short Message Service (SMS). GPRS employs the same modulation schemes as GSM. GPRS allows for an entire frame (all eight time slots) to be used by a single mobile station at the same time. Thus, higher data throughput rates are achievable.

The EDGE standard uses both the GMSK modulation and 8-PSK modulation. Also, the modulation type can be changed from burst to burst. 8-PSK modulation in EDGE is a linear, 8-level phase modulation with 3π/8 rotation, while GMSK is a non-linear, Gaussian-pulse-shaped frequency modulation. However, the specific GMSK modulation used in GSM can be approximated with a linear modulation (i.e., 2-level phase modulation with a π/2 rotation). The symbol pulse of the approximated GSMK and the symbol pulse of 8-PSK are identical.

In GSM/EDGE, frequency bursts are sent regularly by the base station to allow mobile devices to synchronize their local oscillator (LO) to the base station LO, using frequency offset estimation and correction. These bursts may be a single tone, which corresponds to all "0" payload and training sequence. The all zero payload of the frequency burst is a constant frequency signal, or a single tone burst. When in power mode, the remote terminal hunts continuously for a frequency burst from a list of carriers. Upon detecting a frequency burst, the mobile device will estimate the frequency offset relative to its nominal frequency, which is 67.7 KHz from the carrier. The mobile device LO will be corrected using this estimated frequency offset. In power up mode, the frequency offset can be as much as +/−19 KHz. The MS will periodically wake up to monitor the frequency burst to maintain its synchronization in standby mode. In the standby mode, the frequency offset is within ±2 KHz.

Figure 6:
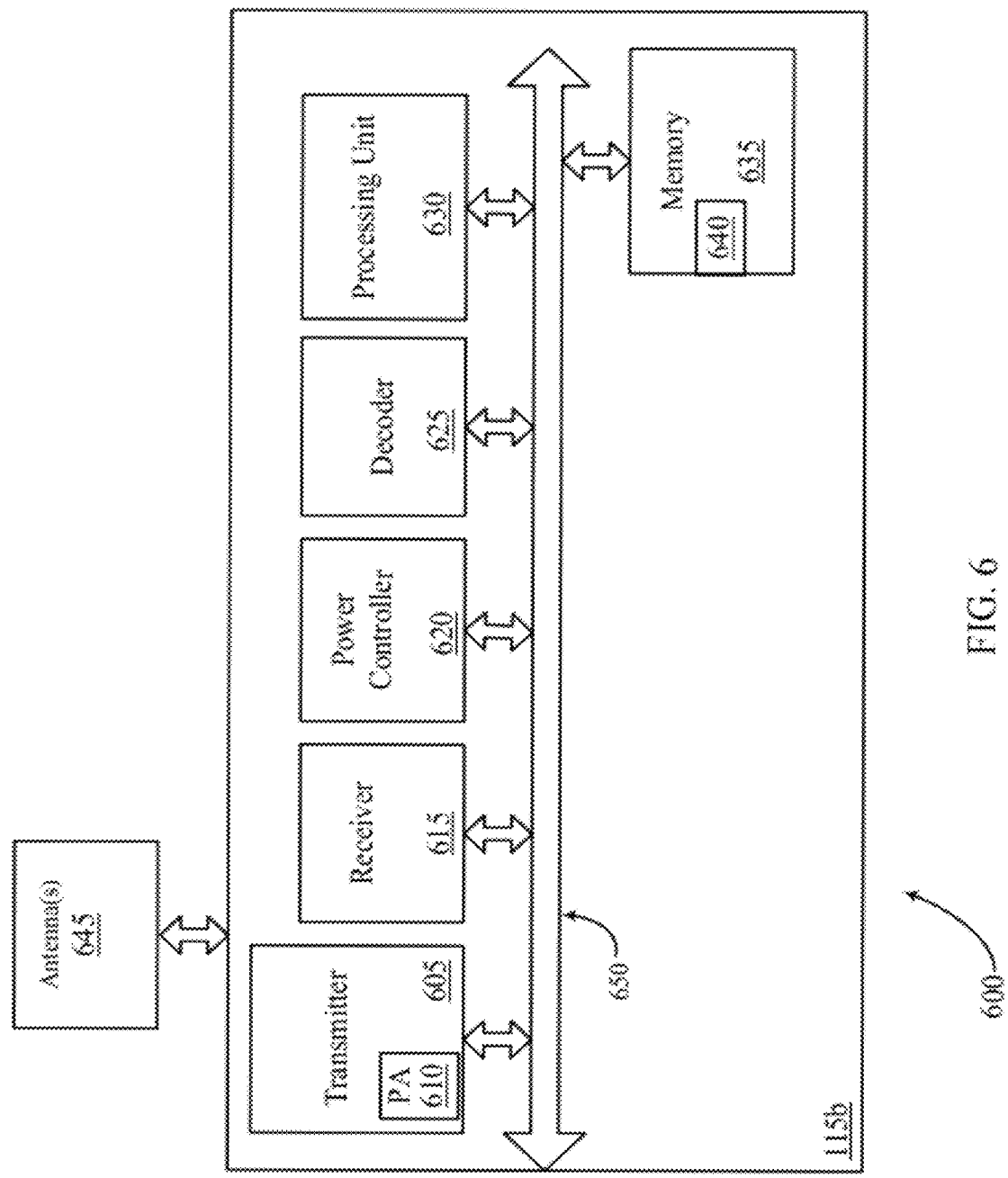
FIG. 6 illustrates an example of a mobile device.

FIG. 6 illustrates a block diagram 600 of a mobile device 115*b* in which the mobile device 115*b* includes transmit circuitry 605 (including a power amplifier 610), receiver 615, power controller 620, decoder 625, a processing unit 630 for use in processing signals, and memory 635. The transmit circuitry 605 and the receive circuitry 615 may allow transmission and reception of data, such as audio communications, between the mobile device 115*b* and a remote location. The transmit circuitry 605 and receive circuitry 615 may be coupled to an antenna 645. The mobile device 115b may be the mobile device 115 of FIG. 1.

The processing unit 630 controls operation of the mobile device 115b. The processing unit 630 may also be referred to as a CPU. The processing unit 630 may monitor a signal quality metric associated with a received wireless signal. The processing unit 630 may determine whether the signal quality metric crosses a threshold quality level for a prescribed time period. The processing unit 630 may communicate with the power controller 620 to de-activate (or re-activate) signal processing functionality applicable to the threshold and time period. Certain functionality in the receiver 615, power controller 620, decoder 625, or processing unit 630 (e.g., interference cancellation, equalization, amplification, adjacent channel interference correction, Doppler shift correction, frequency error correction, or phase error correction) may be de-activated (e.g., suspended) depending on the signal quality and applicable threshold and time period.

Memory 635, which may include both read-only memory (ROM) and random access memory (RAM), provides instructions and data to the processing unit 630. A portion of the memory 635 may also include non-volatile random access memory (NVRAM).

The various components of the mobile device 115b are coupled together by a bus system 650 which may include a power bus, a control signal bus, and a status signal bus in addition to a data bus. For the sake of clarity, the various busses are illustrated in FIG. 6 as the bus system 650.

The steps of the methods discussed may also be stored as instructions in the form of software or firmware located in memory in a base station. These instructions may be executed by the control unit of the base station. Alternatively, or in conjunction, the steps of the methods discussed may be stored as instructions in the form of software or firmware 640 located in memory 635 in the mobile device 115b. These instructions may be executed by the processing unit 630 of the mobile device 115b in FIG. 6.

Figure 7:
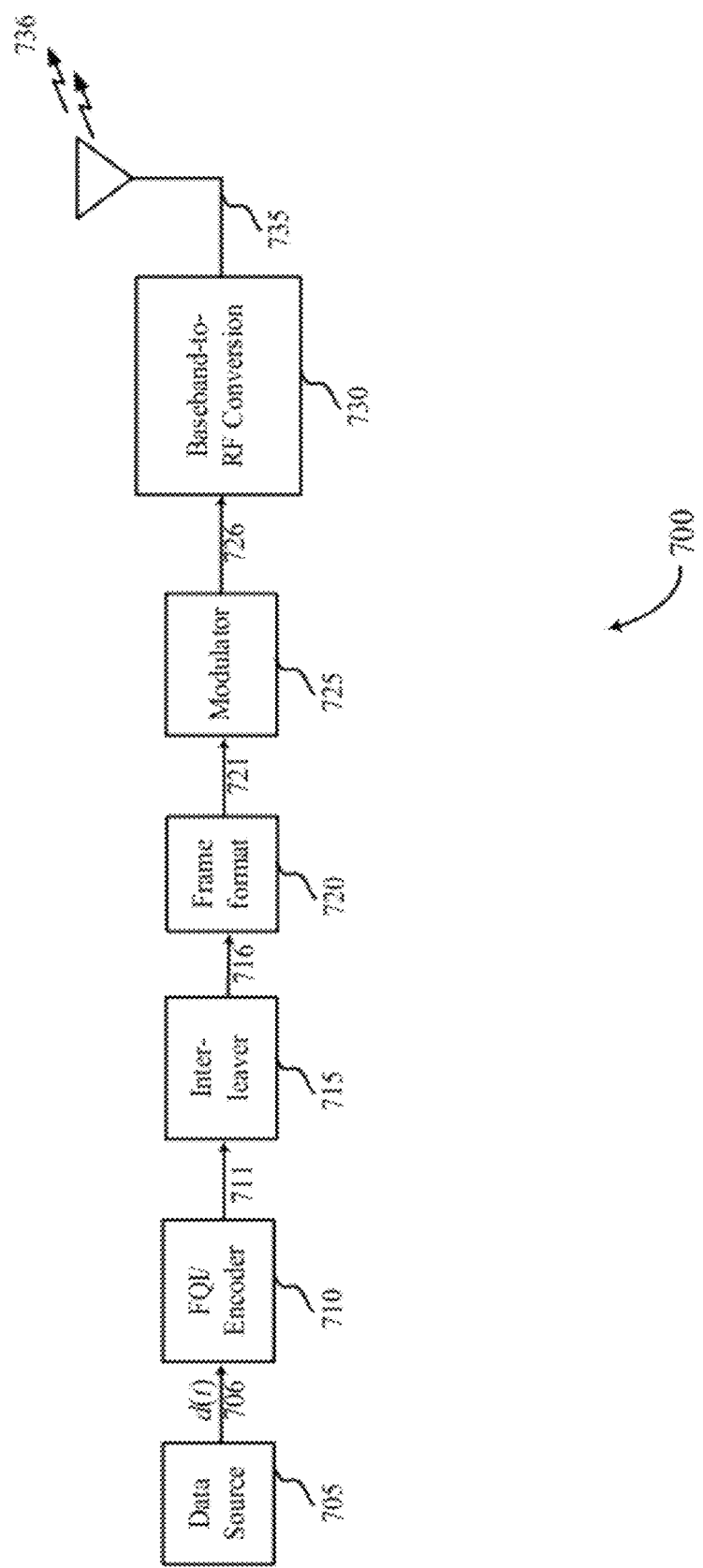
FIG. 7 illustrates an example of a transmitter structure and/or process, which may be implemented, e.g., at a mobile device.

FIG. 7 illustrates an block diagram 700 of a transmitter structure and/or process, which may be implemented, e.g., at mobile device 115. The functions and components shown in FIG. 7 may be implemented by software, hardware, or a combination of software and hardware.

In FIG. 7, a data source 705 provides data d(t) or 706 to an FQI/encoder 710. The FQI/encoder 710 may append a frame quality indicator (FQI) such as a cyclic redundancy check (CRC) to the data d(t) 706. The FQI/encoder 710 may further encode the data and FQI using one or more coding schemes to provide encoded symbols 711. Each coding scheme may include one or more types of coding, e.g., convolutional coding, Turbo coding, block coding, repetition coding, other types of coding, or no coding at all. Other coding schemes may include automatic repeat request (ARQ), hybrid ARQ (H-ARQ), and incremental redundancy repeat techniques. Different types of data may be encoded with different coding schemes.

An interleaver 715 interleaves the encoded data symbols 711 in time to combat fading, and generates symbols 716. The interleaved symbols of signal 716 may be mapped by a frame format block 720 to a pre-defined frame format to produce a frame 721. In an example, a frame format may specify the frame as being composed of a plurality of sub-segments. Sub-segments may be any successive portions of a frame along a given dimension, e.g., time, frequency, code, or any other dimension. A frame may be composed of a fixed plurality of such sub-segments, each sub-segment containing a portion of the total number of symbols allocated to the frame.

In one example, the interleaved symbols 716 are segmented into a plurality S of sub-segments making up a frame 721.

A frame format may further specify the inclusion of, e.g., control symbols (not shown) along with the interleaved symbols 716. Such control symbols may include, e.g., power control symbols, frame format information symbols, etc.

A modulator 725 modulates the frame 721 to generate modulated data 726. Examples of modulation techniques include binary phase shift keying (BPSK) and quadrature phase shift keying (QPSK). The modulator 725 may also repeat a sequence of modulated data.

A baseband-to-radio-frequency (RF) conversion block 730 may convert the modulated signal 726 to RF signals for transmission via an antenna 735 as signal 736 over a wireless communication link to one or more Node B station receivers.

Figure 8A:
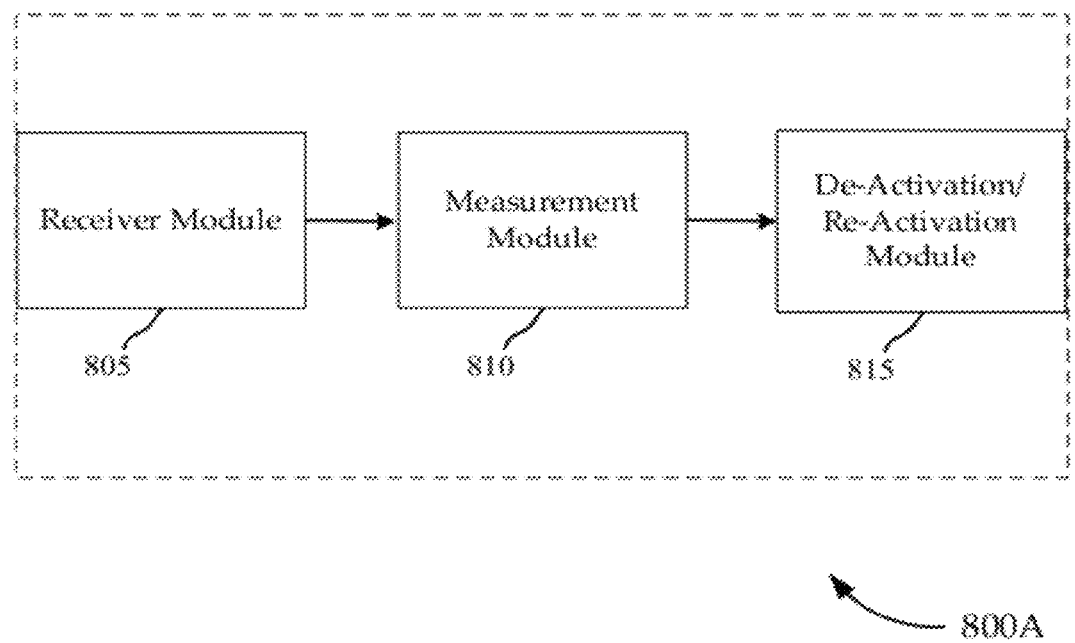
FIG. 8A illustrates an example of a system for controlling signal processing functionality in a mobile device.

Turning to FIG. 8A, a block diagram is shown illustrating an example of a system 800A of certain components for controlling power in a mobile device. This system 800A may be implemented by the system 100 of FIG. 1 or, more specifically, in the mobile device 115 of FIG. 1, 2, or 6. This system 800A may be implemented in the controller/processor 240 of FIG. 2 or 3, or the processing unit 630 of FIG. 6. However, some or all of the functionality of these modules may be implemented in other devices or sets of devices.

The system 800A includes a receiver module 805, a measurement module 810, and a de-activation/re-activation control module 815, which may each be in communication with each other. These modules may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 805 may receive a wireless signal, and the measurement module 810 may measure a signal quality metric of the received wireless signal. The de-activation/re-activation control module 815 may monitor the measured signal quality, determine when the signal quality metric exceeds a threshold quality level for a time period, and de-activate a subset of baseband signal processing functionality responsive to the determination.

The de-activation/re-activation control module 815 may initiate a timer for the time period when the mobile device transitions to idle mode, although in some examples the system operates in connected mode and idle mode. By way of example, there may be different threshold quality levels when the mobile device is in idle mode or connected mode. There may be different applicable time periods when a mobile device is in idle mode or connected mode. In other examples, the operation may be the same in each mode. The de-activation/re-activation control module 815 may also be configured to determine that the signal quality metric has dropped below a re-activation threshold quality level for a re-activation time period, and re-activate the subset of signal processing functionality in response to the determination. The threshold quality level and the re-activation threshold quality level may be different levels for some, or all, of the different types of controlled signal processing functionality. There may also be different re-activation threshold quality levels or time periods when the mobile device is in idle mode or connected mode. In other examples, the requirements for signal lock may be reduced responsive to the determination, or the activation of signal processing functionality may be delayed responsive to the determination.

Figure 8B:
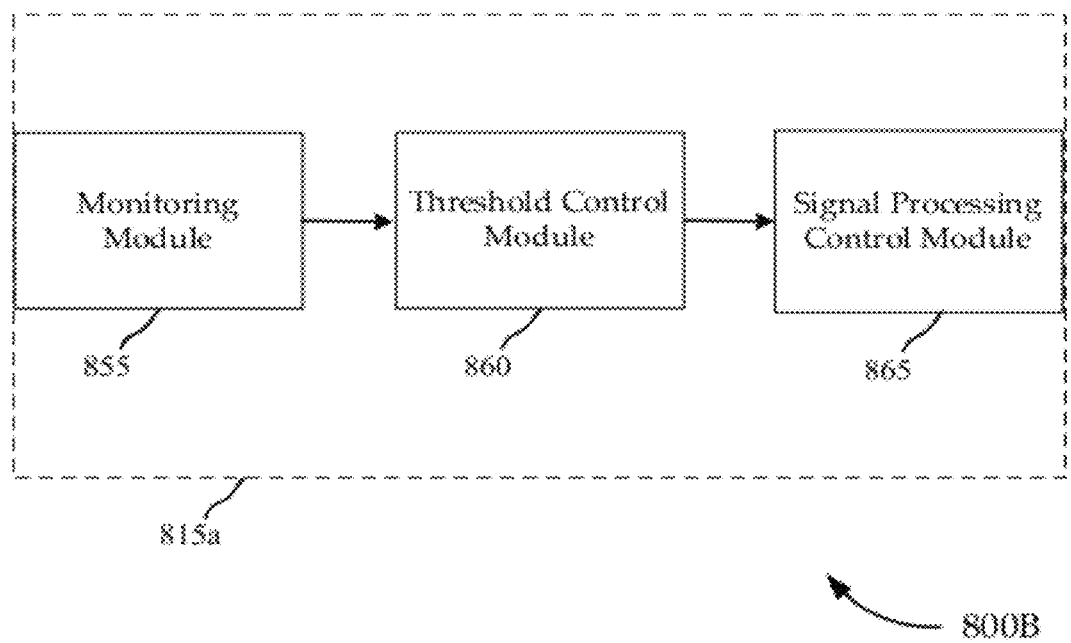
FIG. 8B illustrates another example of a system for controlling signal processing functionality in a mobile device.

Turning to FIG. 8B, a block diagram is shown illustrating an example of a system 800B for controlling power in a mobile device. This processor may be implemented by the system 100 of FIG. 1 or, more specifically, in the mobile device 115 of FIG. 1, 2, or 6. This system 800 may be implemented in the controller/processor 240 of FIG. 2 or 3, or the processing unit 630 of FIG. 6. However, some or all of the functionality of these modules may be implemented in other devices or sets of devices.

The system 800B includes a monitoring module 855, a threshold control module 860, and a signal processing control module 865, which may each be in communication with each other. These modules may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. The system 800B may, in one example, be the de-activation/re-activation control module 815 addressed in FIG. 8A.

The monitoring module 855 may monitor a signal quality metric of a received wireless signal. The threshold control module 860 may determine when the signal quality metric exceeds a threshold quality level for a time period. The signal processing control module 865 may de-activate a subset of signal processing functionality responsive to the determination.

There may be different threshold quality levels and time periods when a mobile device is operating in idle mode or connected mode, and these levels may be set by the threshold control module 860. For example, when in idle mode, performance may be less of a concern than in connected mode, and thus certain advanced baseband signal processing functionality may be de-activated shortly after the device transitions to idle mode, depending on signal quality. Thus, in one example, threshold control module 860 may set different thresholds for idle and connected mode.

There may also be different threshold levels (and time periods) set for re-activation of the advanced baseband signal processing functionality. Thus, while the functionality may be de-activated when the signal quality is good in idle mode, the functionality may be re-activated as the signal degrades and/or the system transitions into connected mode. Thus, the threshold control module 860 may set a re-activation threshold and time period for certain functionality (which may be different for idle mode than for connected mode).

Figure 9:
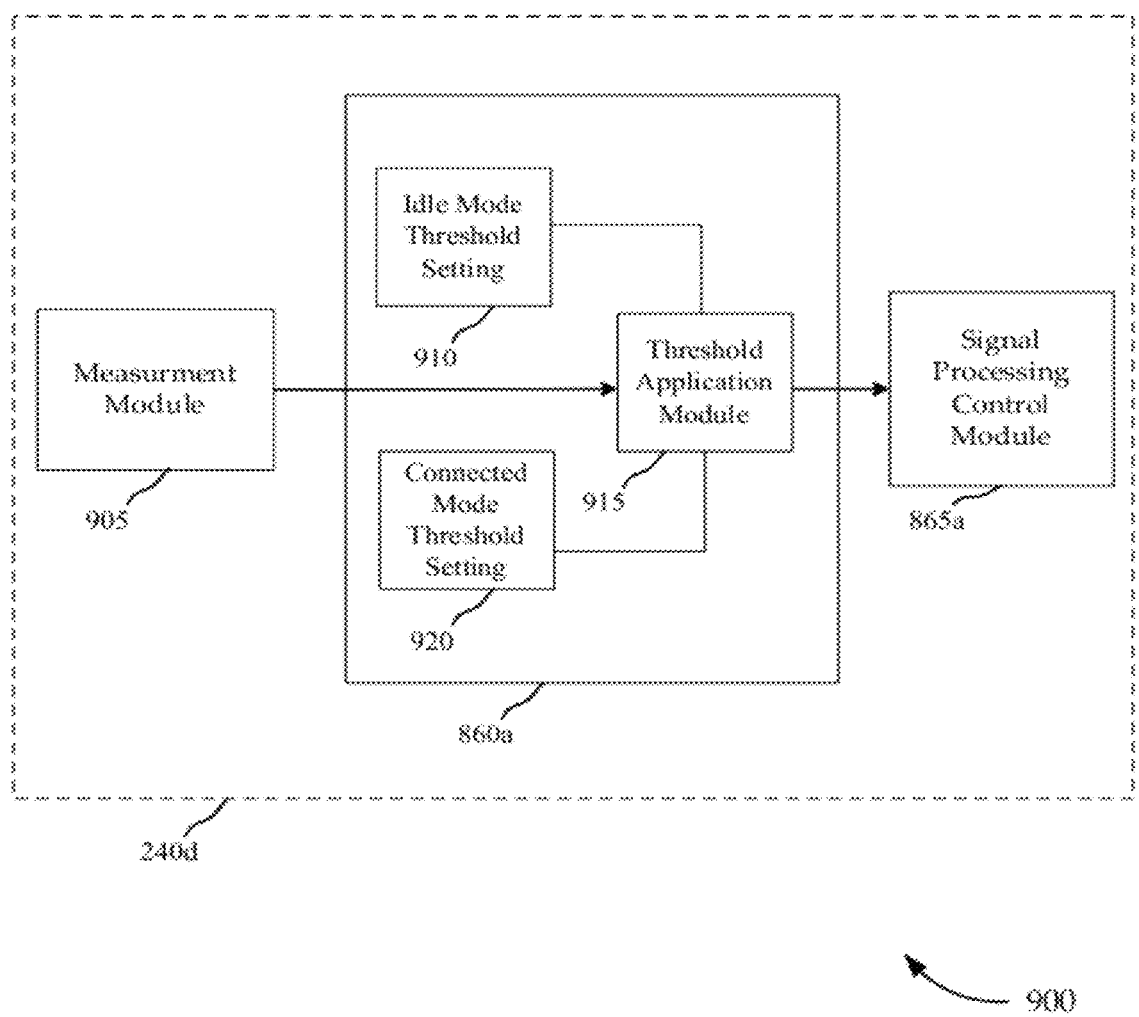
FIG. 9 illustrates an example of a controller/processor for limiting power use in a mobile device.

Turning to FIG. 9, a block diagram 900 is shown illustrating an example controller/processor 240d for controlling power in a mobile device. This controller/processor 240d may be implemented by the system 100 of FIG. 1 or, more specifically, in the mobile device 115 of FIG. 1, 2, or 6. This controller/processor 240d may be the controller/processor 240 of FIG. 2 or 3, or the processing unit 630 of FIG. 6. This controller/processor 240d may also represent the system 800A, 800B of FIG. 8A or 8B. However, some or all of the functionality of these modules may be implemented in other devices or sets of devices.

The controller/processor 240d includes a measurement module 905, a threshold control module 860a, and a signal processing control module 865a. The threshold control module 860a includes an idle mode threshold setting 910 module, a connected mode threshold setting 920 module, and a threshold application module 915.

The measurement module 905 may measure a signal-to-noise ratio, a bit error rate, a received power level, re-encoded bit error rate (e.g., calculated on the PCH block), or any other communication link quality indicator. The idle mode threshold setting 910 module may set various signal quality thresholds to control power consumption at the device during idle mode. The idle mode threshold setting 910 module may also set time periods to be associated with each idle mode threshold. The idle mode threshold setting 910 module may set different threshold quality levels and time periods for different types of advanced signal processing (e.g., interference cancellation, equalization, amplification, adjacent channel interference correction, Doppler shift correction, frequency error correction, or phase error correction). The idle mode threshold setting 910 module may also set the re-activation thresholds and time periods to be associated with various signal processing functionality. The connected mode threshold setting 920 module may set various signal quality thresholds to control power consumption at the device during connected mode. The connected mode threshold setting 920 module may also set time periods to be associated with each such threshold. The connected mode threshold setting 920 module may set different threshold quality levels and time periods for different types of advanced signal processing. The connected mode threshold setting 920 module may also set the re-activation thresholds and time periods to be associated with various signal processing functionality.

The threshold application module 915 may determine whether a mobile device is in idle or connected mode. The threshold application module 915 may receive the signal quality measurements from the measurement module 905. The threshold application module 915 may apply the received signal quality measurements to the applicable thresholds, depending on whether the mobile device is operating in idle or connected mode. When the threshold application module 915 determines that a signal quality metric exceeds a threshold quality level for a given time period, it may notify the signal processing control module 865a, which may de-activate the applicable signal processing functionality responsive to the determination. When the threshold application module 915 determines that a signal quality metric drops below a threshold quality level for a given time period, it may notify the signal processing control module 865a, which may re-activate the applicable signal processing functionality responsive to the determination.

Figure 10:
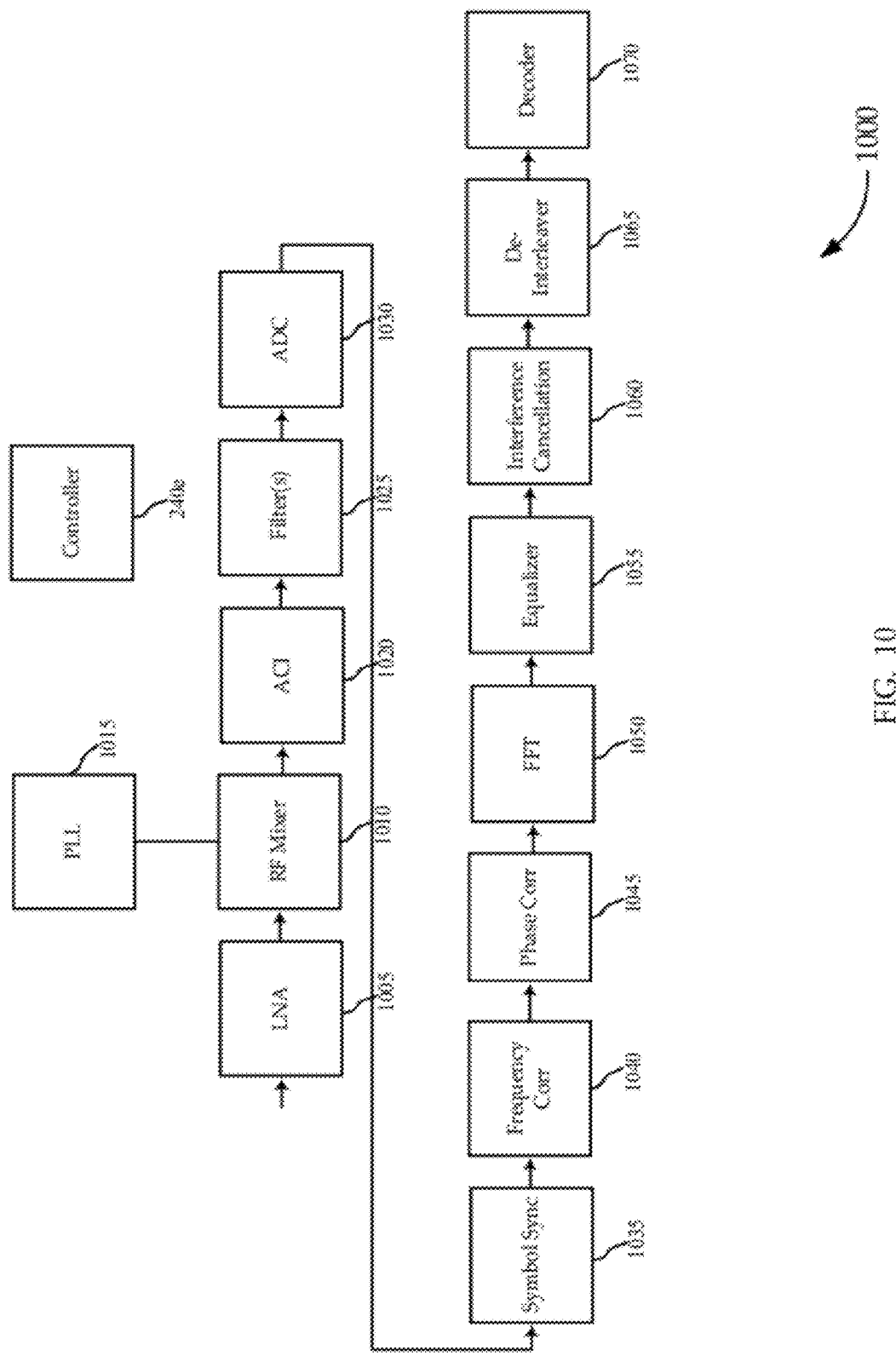
FIG. 10 illustrates an example implementation for limiting power use in a mobile device.

Referring to FIG. 10, a block diagram 1000 is shown illustrating an example series of components in a mobile device. Other components which may be present in such a device have been excluded to more clearly illustrate aspects of the invention. Moreover, certain components may be arranged in different processing orders, and thus the diagram 1000 is for purposes of example only. The series of components may be implemented in the system 100 of FIG. 1 or, more specifically, in the mobile device 115 of FIG. 1, 2, or 6. The controller 240e may be the controller/processor 240 of FIG. 2, 3, or 9, or the processing unit 630 of FIG. 6. This controller 240e may also represent the system 800A, 800B of FIG. 8A or 8B.

However, some or all of the functionality may be implemented in other devices or sets of devices.

The controller 240e may monitor a signal quality metric of a received wireless signal. The controller 240e may determine whether the signal quality metric exceeds a threshold quality for a time period. There may be different threshold qualities and time periods for different components (or aspects of components). The applicable signal processing functionality may be de-activated responsive to the determination.

The system may include a low noise amplifier (LNA) 1005, RF mixer 1010, PLL 1015, adjacent channel interference cancellation (ACI) 1020, filter(s) 1025, analog to digital converter (ADC) 1030, symbol synchronization 1035, frequency correction 1040, phase correction 1045, FFT 1050, equalizer 1055, interference cancellation 1060, de-interleaver 1065, and decoder 1070. These components may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application specific processors.

In one example, the radio frequency signal is received via an antenna (not shown). The desired signal is amplified by the LNA 1005, and down-converted through the RF mixer 1010 (using the signal from the PLL 1015). The output of the RF mixer 1010 is the analog baseband (or passband at much lower frequency than the original radio frequency) signal, which may be processed by the ACI 1020 and filter(s) 1025. It may be converted into a digital signal by the ADC 1030. The controller 240e may de-activate one or more aspects of the LNA 1005, ACI 1020, or filter(s) 1025 when signal quality improves above a threshold. There may be different thresholds for each of the LNA 1005, ACI 1020, and filter(s) 1025, and there may be different thresholds for a given component in idle or connected mode.

The symbol sync 1035 may group the digitized signal into symbols with a symbol boundary properly identified, and the guard periods (typically cyclic prefix) removed. The frequency correction 1040 and phase correction 1045 may correct frequency and/or phase errors. The symbol timing, frequency, and phase errors may be estimated and corrected before and/or after the FFT is performed. Regardless, the signal is provided to FFT 1050 where it is transformed to the frequency domain. The signal may then be processed by the equalizer 1055. In one example, therefore, the equalizer 1055 processes the signal in the frequency domain. The equalized signal may then be processed by interference cancellation 1060, and this signal may be de-interleaved and decoded by the de-interleaver 1065 and decoder 1070, respectively. The controller 240e may de-activate one or more aspects of frequency correction 1040, phase correction 1045, or equalizer 1055 when signal quality improves above a threshold. There may be different thresholds for each of the frequency correction 1040, phase correction 1045, and equalizer 1055, and there may be different thresholds for a given component in idle or connected mode.

When a measured signal quality improved, there are additional actions that the controller may undertake (each may have different threshold level and/or time period). For example, the controller 240e may dynamically adjust the training time for the PLL 1015 or other components as the signal quality improves or degrades. In another example, as signal quality improves, there may be less strict requirements to obtain signal lock. As described herein, "de-activation" may be a temporary suspension, a powering down, a shut off, or a lower power mode. The "re-activation" may be a temporary activation, or a powering up from an off mode or a low power mode, for example.

Figure 11:
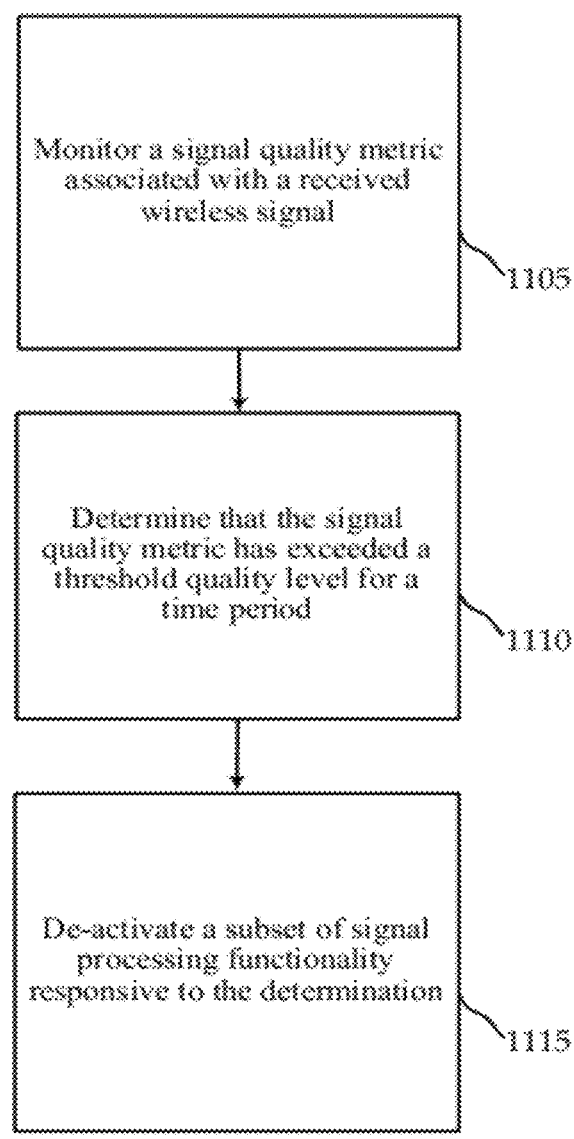
FIG. 11 illustrates an example of a method for limiting power use in a mobile device.

FIG. 11 illustrates a method 1100 for controlling power consumption in a mobile device. This method 1100 may be performed in the system 100 of FIG. 1 or, more specifically, by the mobile device 115 of FIG. 1, 2, or 6. This method 1000 may also be performed by the controller/processor 240 of FIG. 2, 3 or 9, or the processing unit 630 of FIG. 6. This method 1100 may also be performed by the system 800A, 800B of FIG. 8A or 8B. However, some or all of the functionality may be implemented in other devices or sets of devices.

At stage 1105, a signal quality metric of a received wireless signal is monitored. At stage 1110, a determination is made whether the signal quality metric exceeds a threshold quality level for a time period. At stage 1115, a subset of signal processing functionality is de-activated responsive to the determination.

Figure 12A:
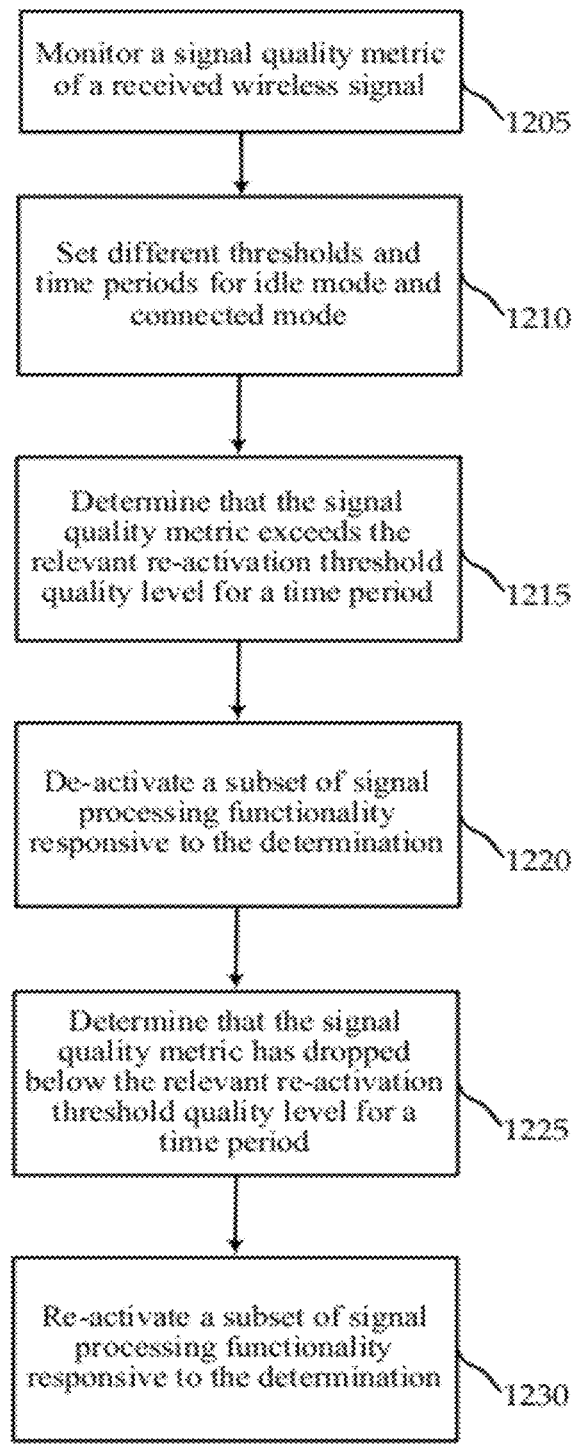
FIG. 12A illustrates an example of an alternative method for controlling power use in a mobile device.

FIG. 12A illustrates a method 1200A for controlling power consumption in a mobile device. This method 1200A may be performed in the system 100 of FIG. 1 or, more specifically, by the mobile device 115 of FIG. 1, 2, or 6. This method 1200A may also be performed by the controller/processor 240 of FIG. 2, 3 or 9, or the processing unit 630 of FIG. 6. This method 1200A may also be performed by the system 800A, 800B or FIG. 8A or 8B. However, some or all of the functionality may be implemented in other devices or sets of devices.

At stage 1205, a signal quality metric of a received wireless signal is monitored. At stage 1210, different thresholds and time periods are set for idle mode and connected mode. At stage 1215, a first determination is made that the signal quality metric exceeds the relevant threshold quality level for a time period. At stage 1220, a subset of the signal processing functionality is de-activated responsive to the first determination. At stage 1225, a second determination is made that the signal quality metric has dropped below the relevant re-activation threshold quality level for a time period. At stage 1230, a subset of the signal processing functionality is re-activated responsive to the second determination.

Figure 12B:
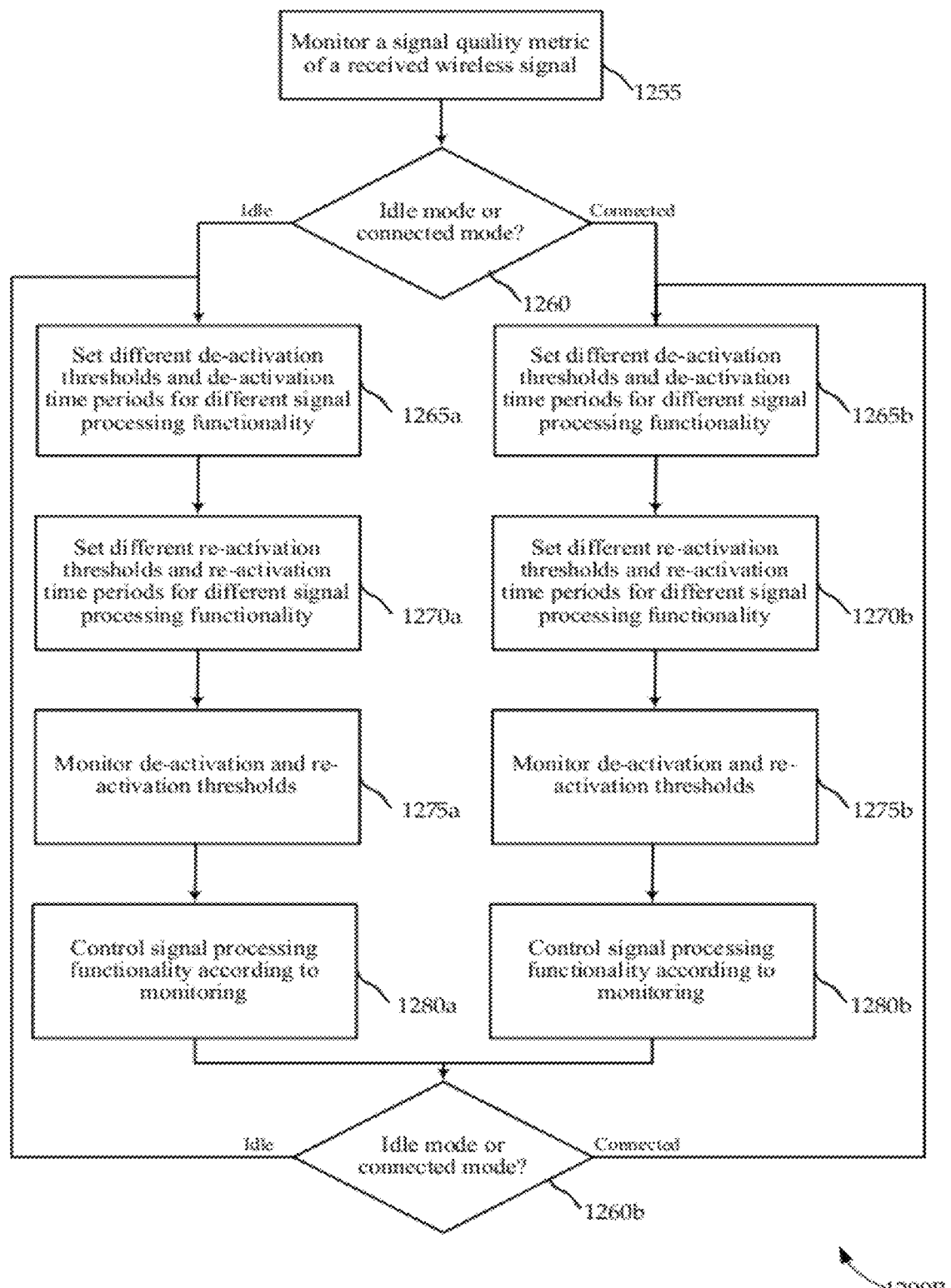
FIG. 12B illustrates an example of an alternative method for controlling power use in connected and idle mode in a mobile device.

FIG. 12B illustrates a method 1200B for controlling power consumption in a mobile device. This method 1200B may be performed in the system 100 of FIG. 1 or, more specifically, by the mobile device 115 of FIG. 1, 2, or 6. This method 1200B may also be performed by the controller/processor 240 of FIG. 2, 3 or 9, or the processing unit 630 of FIG. 6. This method 1200B may also be performed by the system 800A, 800B or FIG. 8A or 8B. However, some or all of the functionality may be implemented in other devices or sets of devices.

At stage 1255, a signal quality metric of a received wireless signal is monitored. At stage 1260, a determination is made whether a receiving device is in idle mode or connected mode.

The following may occur if the device is in idle mode. At stage 1265a, different de-activation thresholds and de-activation time periods are set for different types of signal processing functionality, the de-activation thresholds and de-activation time periods for idle mode. At stage 1270a, different re-activation thresholds and re-activation time periods are set for different types of signal processing functionality, the re-activation thresholds and re-activation time periods for idle mode. At stage 1275a, signal quality related to de-activation and re-activation thresholds is monitored. At stage 1280a, signal processing functionality is controlled (e.g., de-activated or re-activated) according to the monitoring.

The following may occur if the device is in connected mode. At stage 1265b, different de-activation thresholds and de-activation time periods are set for different types of signal processing functionality, the de-activation thresholds and de-activation time periods for connected mode. At stage 1270b, different re-activation thresholds and re-activation time periods are set for different types of signal processing functionality, the re-activation thresholds and re-activation time periods for connected mode. At stage 1275b, de-activation and re-activation thresholds are monitored. At stage 1280b, signal processing functionality is controlled according to the monitoring.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining, and the like. Also, "determining" can include receiving (e.g., receiving information), accessing (e.g., accessing data in a memory), and the like. Also, "determining" can include resolving, selecting, choosing, establishing, and the like.

The phrase "based on" does not mean "based only on," unless expressly specified otherwise. In other words, the phrase "based on" describes both "based only on" and "based at least on." Also, as used herein, including in the claims, "or" as used in a list of items indicates a disjunctive list such that, for example, a list of "A, B, or C" means A or B or C or AB or AC or BC or ABC (i.e., A and B and C).

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in hardware, software, firmware, or any combination thereof. If implemented in software, the functions may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for signal processing performed by a mobile device, comprising:
    initiating, by a processor of the mobile device, a timer for a time period when a mobile device transitions to idle mode;
    monitoring, by the processor, a signal quality metric associated with a received wireless signal;
    determining, by the processor, that the signal quality metric exceeds a threshold quality level for the time period, the threshold quality level comprising a first threshold quality level when a mobile device is in idle mode, and a second threshold quality level, of higher quality than the first threshold quality level, when the mobile device is in connected mode; and
    de-activating a subset of signal processing functionality responsive to the determination.

2. The method of claim 1, further comprising: suspending a timer for the time period when the mobile device transitions to connected mode.

3. The method of claim 1, wherein the time period comprises: a first time period when a mobile device is in idle mode; and a second time period, longer than the first time period, when the mobile device is in connected mode.

4. The method of claim 1, wherein the threshold quality level and the time period comprise:
    a first threshold quality level and a first time period when a mobile device is in idle mode; and
    a second threshold quality level and a second time period, different from the first threshold quality level and the first time period, when the mobile device is in connected mode.

5. The method of claim 1, further comprising: determining when the signal quality metric drops below a re-activation threshold quality level for a re-activation time period; and re-activating the subset of signal processing functionality responsive to the determination.

6. The method of claim 5, wherein the threshold quality level and the re-activation threshold quality level comprise different levels.

7. The method of claim 5, wherein the re-activation threshold quality level and the re-activation time period comprise:
    a first re-activation threshold quality level and a first re-activation time period when a mobile device is in idle mode; and
    a second re-activation threshold quality level and a second re-activation time period, different from the first re-activation threshold quality level and the first re-activation time period, when the mobile device is in connected mode.

8. The method of claim 1, wherein the subset of signal processing includes signal processing functionality comprising interference cancellation, equalization, amplification, adjacent channel interference correction, Doppler shift correction, frequency error correction, or phase error correction.

9. The method of claim 1, wherein the threshold quality level and the time period comprise:
    a first threshold quality level and a first time period for a first type of signal processing functionality; and
    a second threshold quality level and a second time period, different from the first threshold quality level and the first time period, for a second type of signal processing functionality.

10. The method of claim 1, further comprising: reducing requirements for signal lock responsive to the determination.

11. The method of claim 1, further comprising: delaying activation of signal processing functionality responsive to the determination.

12. The method of claim 1, wherein the signal quality metric comprises an averaged signal quality metric.

13. A device for signal processing comprising:
    means for initiating a timer for a time period when a mobile device transitions to idle mode;
    means for monitoring a signal quality metric associated with a received wireless signal;
    means for determining that the signal quality metric exceeds a threshold quality level for the time period, the threshold quality level comprising a first threshold quality level when a mobile device is in idle mode, and a second threshold quality level, of higher quality than the first threshold quality level, when the mobile device is in connected mode; and
    means for de-activating a subset of signal processing functionality responsive to the determination.

14. The device of claim 13, further comprising: means for determining when the signal quality metric drops below a re-activation threshold quality level for a re-activation time period; and means for re-activating the subset of signal processing functionality responsive to the determination.

15. A mobile device for signal processing, comprising:
    a receiver module configured to receive a wireless signal;
    a measurement module configured to measure a signal quality metric of the received wireless signal; and a de-activation module, communicatively coupled with the measurement module, and configured to:
  initiate a first timer for a time period when the mobile device transitions to idle mode;
  monitor the measured signal quality;
  determine when the signal quality metric exceeds a threshold quality level for the time period, the threshold quality level comprising a first threshold quality level when a mobile device is in idle mode, and a second threshold quality level, of higher quality than the first threshold quality level, when the mobile device is in connected mode; and
  de-activate a subset of baseband signal processing functionality responsive to the determination.

16. The mobile device of claim 15, wherein the mobile device executes the de-activation module in connected mode or idle mode.

17. The mobile device of claim 15, wherein the time period comprises: a first time period when a mobile device is in idle mode; and a second time period, longer than the first time period, when the mobile device is in connected mode.

18. The mobile device of claim 15, further comprising: a re-activation module, communicatively coupled with the measurement module, and configured to:
  determine that the signal quality metric has dropped below a re-activation threshold quality level for a re-activation time period; and
  re-activate the subset of signal processing functionality responsive to the determination.

19. The mobile device of claim 18, wherein the threshold quality level and the re-activation threshold quality level comprise different levels.

20. The mobile device of claim 18, wherein the re-activation threshold quality level and the re-activation time period comprise:
  a first re-activation threshold quality level and a first re-activation time period when the mobile device is in idle mode; and
  a second re-activation threshold quality level and a second re-activation time period, different in quality level or time from the first re-activation threshold quality level and the re-activation first time period, when the mobile device is in connected mode.

21. The mobile device of claim 15, wherein the subset of signal processing includes signal processing functionality comprising interference cancellation, equalization, amplification, adjacent channel interference correction, Doppler shift correction, frequency error correction, phase error correction, or any combination thereof.

22. The mobile device of claim 15, wherein requirements for signal lock are reduced responsive to the determination.

23. The mobile device of claim 15, wherein activation of signal processing functionality is delayed responsive to the determination.

24. A computer program product comprising a computer-readable storage medium, the computer-readable storage medium comprising:
  code for causing a computer to initiate a timer for a time period when a mobile device transitions to idle mode;
  code for causing a computer to monitor a signal quality metric associated with a wireless signal;
  code for causing a computer to determine that the signal quality metric exceeds a threshold quality level for the time period, the threshold quality level comprising a first threshold quality level when a mobile device is in idle mode, and a second threshold quality level, of higher quality than the first threshold quality level, when the mobile device is in connected mode; and
  code for causing a computer to de-activate a subset of signal processing functionality responsive to the determination.

25. The computer program product according to claim 24, wherein the mobile device executes the code in idle or connected mode.

26. The computer program product according to claim 24, wherein the threshold quality level comprises:
  a first threshold quality level and a first time period when the mobile device is in idle mode; and
  a second threshold quality level and a second time period, different from the first threshold quality level and the first time period, when the mobile device is in connected mode.

27. The computer program product according to claim 24, wherein the time period comprises: a first time period when a mobile device is in idle mode; and a second time period, longer than the first time period, when the mobile device is in connected mode.

28. The computer program product according to claim 24, wherein the computer-readable storage medium further comprises:
  code for causing a computer to determine that the signal quality metric has dropped below a re-activation threshold quality level for a re-activation time period; and
  code for causing a computer to re-activate the subset of signal processing functionality responsive to the determination.

29. The computer program product according to claim 28, wherein the threshold quality level and the re-activation threshold quality level comprise different levels.

30. The computer program product according to claim 24, wherein the subset of signal processing includes signal processing functionality comprising interference cancellation, equalization, amplification, adjacent channel interference correction, Doppler shift correction, frequency error correction, or phase error correction.

31. The computer program product according to claim 24, wherein the threshold quality level and the time period comprise:
  a first threshold quality level and a first time period for a first type of signal processing functionality; and
  a second threshold quality level and a second time period, different from the first threshold quality level and the first time period, for a second type of signal processing functionality.

32. The computer program product according to claim 24, wherein the computer-readable storage medium further comprises:
  code for causing a computer to reduce requirements for signal lock responsive to the determination; or
  code for causing a computer to delay activation of signal processing functionality responsive to the determination.

33. A wireless communication method performed by a mobile device, comprising:
  monitoring a signal quality metric associated with a received wireless signal;
  determining that the signal quality metric exceeds a threshold quality level for a time period, the time period comprising a first time period length when a mobile device is in idle mode; and a second time period length, longer than the first time period length, when the mobile device is in connected mode; and de-activating a subset of signal processing functionality responsive to the determination.

34. The method of claim 33, further comprising: initiating a timer for the time period when a mobile device transitions to idle mode.

35. The method of claim 34, further comprising: suspending a timer for the time period when the mobile device transitions to connected mode.

36. The method of claim 33, wherein the threshold quality level comprises:
a first threshold quality level when a mobile device is in idle mode; and
a second threshold quality level, of higher quality than the first threshold quality level, when the mobile device is in connected mode.

37. The method of claim 33, wherein the threshold quality level and the time period comprise:
a first threshold quality level and a first time period when a mobile device is in idle mode; and
a second threshold quality level and a second time period, different from the first threshold quality level and the first time period, when the mobile device is in connected mode.

38. The method of claim 33, further comprising: determining when the signal quality metric drops below a re-activation threshold quality level for a re-activation time period; and re-activating the subset of signal processing functionality responsive to the determination.

39. The method of claim 38, wherein the threshold quality level and the re-activation threshold quality level comprise different levels.

40. The method of claim 38, wherein the re-activation threshold quality level and the re-activation time period comprise:
a first re-activation threshold quality level and a first re-activation time period when a mobile device is in idle mode; and
a second re-activation threshold quality level and a second re-activation time period, different from the first re-activation threshold quality level and the first re-activation time period, when the mobile device is in connected mode.

41. The method of claim 33, wherein the subset of signal processing includes signal processing functionality comprising interference cancellation, equalization, amplification, adjacent channel interference correction, Doppler shift correction, frequency error correction, or phase error correction.

42. The method of claim 33, wherein the threshold quality level and the time period comprise:
a first threshold quality level and a first time period for a first type of signal processing functionality; and
a second threshold quality level and a second time period, different from the first threshold quality level and the first time period, for a second type of signal processing functionality.

43. The method of claim 33, further comprising: reducing requirements for signal lock responsive to the determination.

44. The method of claim 33, further comprising: delaying activation of signal processing functionality responsive to the determination.

45. The method of claim 33, wherein the signal quality metric comprises an averaged signal quality metric.

46. A mobile device configured for wireless communication, comprising:
a receiver module configured to receive a wireless signal;
a measurement module configured to measure a signal quality metric of the received wireless signal; and
a de-activation module, communicatively coupled with the measurement module, and configured to:
monitor the measured signal quality;
determine when the signal quality metric exceeds a threshold quality level for a time period, the time period comprising a first time period length when a mobile device is in idle mode; and a second time period length, longer than the first time period length, when the mobile device is in connected mode; and
de-activate a subset of baseband signal processing functionality responsive to the determination.

47. The mobile device of claim 46, wherein the de-activation module is further configured to:
initiate a first timer for the time period when the mobile device transitions to idle mode.

48. The mobile device of claim 46, wherein the mobile device executes the de-activation module in connected mode or idle mode.

49. The mobile device of claim 46, wherein the threshold quality level comprises:
a first threshold quality level when the mobile device is in idle mode; and a second threshold quality level, of higher quality than the first threshold quality level, when the mobile device is in connected mode.

50. The mobile device of claim 46, further comprising: a re-activation module, communicatively coupled with the measurement module, and configured to:
determine that the signal quality metric has dropped below a re-activation threshold quality level for a re-activation time period; and
re-activate the subset of signal processing functionality responsive to the determination.

51. The mobile device of claim 50, wherein the threshold quality level and the re-activation threshold quality level comprise different levels.

52. The mobile device of claim 50, wherein the re-activation threshold quality level and the re-activation time period comprise:
a first re-activation threshold quality level and a first re-activation time period when the mobile device is in idle mode; and
a second re-activation threshold quality level and a second re-activation time period, different in quality level or time from the first re-activation threshold quality level and the re-activation first time period, when the mobile device is in connected mode.

53. The mobile device of claim 46, wherein the subset of signal processing includes signal processing functionality comprising interference cancellation, equalization, amplification, adjacent channel interference correction, Doppler shift correction, frequency error correction, phase error correction, or any combination thereof.

54. The mobile device of claim 46, wherein requirements for signal lock are reduced responsive to the determination.

55. The mobile device of claim 46, wherein activation of signal processing functionality is delayed responsive to the determination.

56. A computer program product comprising a computer-readable storage medium, the computer-readable storage medium comprising:
code for causing a computer to monitor a signal quality metric associated with a wireless signal;
code for causing a computer to determine that the signal quality metric exceeds a threshold quality level for a time period, the time period comprising a first time period length when a mobile device is in idle mode; and a second time period length, longer than the first time period length, when the mobile device is in connected mode; and code for causing a computer to de-activate a subset of signal processing functionality responsive to the determination.

57. The computer program product according to claim 56, wherein the computer-readable storage medium further comprises: code for causing a computer to initiate a timer for the time period when a mobile device transitions to idle mode.

58. The computer program product according to claim 56, wherein the mobile device executes the code in idle or connected mode.

59. The computer program product according to claim 56, wherein the threshold quality level comprises:
 a first threshold quality level and a first time period when the mobile device is in idle mode; and
 a second threshold quality level and a second time period, different from the first threshold quality level and the first time period, when the mobile device is in connected mode.

60. The computer program product according to claim 56, wherein the computer-readable storage medium further comprises:
 code for causing a computer to determine that the signal quality metric has dropped below a re-activation threshold quality level for a re-activation time period; and
 code for causing a computer to re-activate the subset of signal processing functionality responsive to the determination.

61. The computer program product according to claim 60, wherein the threshold quality level and the re-activation threshold quality level comprise different levels.

62. The computer program product according to claim 56, wherein the subset of signal processing includes signal processing functionality comprising interference cancellation, equalization, amplification, adjacent channel interference correction, Doppler shift correction, frequency error correction, or phase error correction.

63. The computer program product according to claim 56, wherein the threshold quality level and the time period comprise:
 a first threshold quality level and a first time period for a first type of signal processing functionality; and
 a second threshold quality level and a second time period, different from the first threshold quality level and the first time period, for a second type of signal processing functionality.

64. The computer program product according to claim 56, wherein the computer-readable storage medium further comprises:
 code for causing a computer to reduce requirements for signal lock responsive to the determination; or
 code for causing a computer to delay activation of signal processing functionality responsive to the determination.

65. A method for signal processing performed by a mobile device, comprising:
 monitoring, by a processor, a signal quality metric associated with a received wireless signal;
 determining, by the processor, that the signal quality metric exceeds a threshold quality level for a time period, the threshold quality level comprising a first threshold quality level when a mobile device is in idle mode, and a second threshold quality level, of higher quality than the first threshold quality level, when the mobile device is in connected mode;
 de-activating a subset of signal processing functionality responsive to the determination that the signal quality metric exceeds the threshold quality level for the time period;
 determining, by the processor, when the signal quality metric drops below a re-activation threshold quality level for a re-activation time period; and
 re-activating the subset of signal processing functionality responsive to the determination that the signal quality metric has dropped below the re-activation threshold quality level for the re-activation time period.

66. The method of claim 65, further comprising: initiating a timer for the time period when a mobile device transitions to idle mode.

67. The method of claim 66, further comprising: suspending a timer for the time period when the mobile device transitions to connected mode.

68. The method of claim 65, wherein the time period comprises: a first time period when a mobile device is in idle mode; and a second time period, longer than the first time period, when the mobile device is in connected mode.

69. The method of claim 65, wherein the threshold quality level and the time period comprise:
 a first threshold quality level and a first time period when a mobile device is in idle mode; and
 a second threshold quality level and a second time period, different from the first threshold quality level and the first time period, when the mobile device is in connected mode.

70. The method of claim 65, wherein the threshold quality level and the re-activation threshold quality level comprise different levels.

71. The method of claim 65, wherein the re-activation threshold quality level and the re-activation time period comprise:
 a first re-activation threshold quality level and a first re-activation time period when a mobile device is in idle mode; and
 a second re-activation threshold quality level and a second re-activation time period, different from the first re-activation threshold quality level and the first re-activation time period, when the mobile device is in connected mode.

72. The method of claim 65, wherein the subset of signal processing includes signal processing functionality comprising interference cancellation, equalization, amplification, adjacent channel interference correction, Doppler shift correction, frequency error correction, or phase error correction.

73. The method of claim 65, wherein the threshold quality level and the time period comprise:
 a first threshold quality level and a first time period for a first type of signal processing functionality; and
 a second threshold quality level and a second time period, different from the first threshold quality level and the first time period, for a second type of signal processing functionality.

74. The method of claim 65, further comprising: reducing requirements for signal lock responsive to the determination.

75. The method of claim 65, further comprising: delaying activation of signal processing functionality responsive to the determination.

76. The method of claim 65, wherein the signal quality metric comprises an averaged signal quality metric.

* * * * *